United States Patent
Shimamura et al.

(10) Patent No.: US 9,891,610 B2
(45) Date of Patent: Feb. 13, 2018

(54) COMPUTATION UNIT, ASSISTANCE DEVICE, OUTPUT CONTROL METHOD, DISPLAY CONTROL METHOD, AND PROGRAM

(75) Inventors: Junji Shimamura, Osaka (JP); Hiroshi Sawaragi, Shiga (JP); Shinichi Hosomi, Shiga (JP)

(73) Assignee: OMRON CORPORATION, Kyoto (JP)

( * ) Notice: Subject to any disclaimer, the term of this patent is extended or adjusted under 35 U.S.C. 154(b) by 762 days.

(21) Appl. No.: 14/005,298

(22) PCT Filed: Mar. 22, 2011

(86) PCT No.: PCT/JP2011/056779
§ 371 (c)(1),
(2), (4) Date: Nov. 4, 2013

(87) PCT Pub. No.: WO2012/124143
PCT Pub. Date: Sep. 20, 2012

(65) Prior Publication Data
US 2014/0058565 A1 Feb. 27, 2014

(30) Foreign Application Priority Data
Mar. 15, 2011 (JP) ................ 2011-056768

(51) Int. Cl.
*G05B 19/00* (2006.01)
*G05B 19/05* (2006.01)

(52) U.S. Cl.
CPC .. *G05B 19/056* (2013.01); *G05B 2219/36171* (2013.01); *G05B 2219/42189* (2013.01);
(Continued)

(58) Field of Classification Search
CPC ........ G05B 19/056; G05B 2219/36171; G05B 2219/50233; G05B 2219/43174; G05B 2219/42189
(Continued)

(56) References Cited
U.S. PATENT DOCUMENTS 5,609,126 A * 3/1997 Cullen ............ F01L 1/344
123/90.15
6,246,201 B1 * 6/2001 Aderek ............ G05B 19/416
318/560
(Continued)

FOREIGN PATENT DOCUMENTS
JP 3-82137 4/1991
JP 3-296109 12/1991
(Continued)

OTHER PUBLICATIONS

JP Patent Publication No. 2006-048231 (Nori), published on Feb. 16, 2006, p. 1-33.*
(Continued)

*Primary Examiner* — Christopher E. Everett
(74) *Attorney, Agent, or Firm* — Greenblum & Bernstein, P.L.C.

(57) ABSTRACT

A CPU unit of a PLC executes a motion control and a sequence control. The CPU unit stores a CAM table and a control program for performing the motion control using the CAM table. When a microprocessor receives a command for altering one of a plurality of phases and/or a displacement associated with the phase, the microprocessor alters the phase and/or the displacement in the CAM table to a value that is on the basis of the command. When the microprocessor performs the alteration, the microprocessor executes
(Continued)

a control program using a post-alteration CAM table, and outputs the execution results to an apparatus to be controlled.

14 Claims, 22 Drawing Sheets

(52) U.S. Cl.
CPC .............. *G05B 2219/43174* (2013.01); *G05B 2219/50233* (2013.01)

(58) Field of Classification Search
USPC ......................................................... 700/275
See application file for complete search history.

(56) References Cited

U.S. PATENT DOCUMENTS

| | | | | |
|---|---|---|---|---|
| 6,333,613 B1 * | 12/2001 | Watanabe | ............ | G05B 19/414 318/568.1 |
| 2004/0056626 A1 | 3/2004 | Fujinawa | | |

FOREIGN PATENT DOCUMENTS

| | | |
|---|---|---|
| JP | 4-76608 | 3/1992 |
| JP | 8-126375 | 5/1996 |
| JP | 8-339218 | 12/1996 |
| JP | 9-289788 | 11/1997 |
| JP | 10-174478 | 6/1998 |
| JP | 2005-209093 | 8/2005 |
| JP | 2006-48231 | 2/2006 |
| JP | 2006-293692 | 10/2006 |
| JP | 2007-140655 | 6/2007 |
| JP | 2009-289058 | 12/2009 |
| JP | 2010-260323 | 11/2010 |
| JP | 2010-282419 | 12/2010 |
| WO | 02/091090 | 11/2002 |

OTHER PUBLICATIONS

JP Patent Publication No. 03-296109 (Kazuo), published on Dec. 26, 1991, p. 1-10.*
JP Patent Publication No. 2009-289058 (SAT), published on Dec. 10, 2009, p. 1-23.*
"Technical Specification PLCopen—Technical Committee 2—Task Force, Function blocks for motion control (Formerly Part 1 and Part 2), PLCopen Working Draft, Version 1.99—Release for comments—till Aug. 16, 2010" May 21, 2010.
International Search report for PCT/JP2011/056779, dated Jun. 7, 2011.
U.S. Appl. No. 14/005,288 to Junji Shimamura et al., filed Sep. 16, 2013.

* cited by examiner

Fig. 10

```
                                             ─ 530
CAM table No. 1[0].phase = 0.0

CAM table No. 1[0].displacement = 0.0

CAM table No. 1[1].phase = 0.1

CAM table No. 1[1].displacement = 1.0
                  ⋮

CAM table No. 1[999].phase = 0.0

CAM table No. 1[999].displacement = 0.0
```

| Index | Phase | Displacement | | |
|---|---|---|---|---|
| 0 | 0.0 | 0.0 | ← Starting point of CAM table | |
| 1 | 0.1 | 1.0 | | |
| 2 | 0.2 | 5.0 | | Significant CAM data (number) |
| ... | ... | ... | | |
| k | $\theta a$ | $\delta 1$ | | |
| ... | ... | ... | | |
| 3598 | 359.8 | 10.0 | Terminating point of CAM table | |
| 3599 | 359.9 | 5.0 | | |
| 3600 | 360.0 | 0.0 | ← | |
| | 0.0 | 0.0 | | Maximum number of CAM data |
| | 0.0 | 0.0 | | |
| | ⋮ | ⋮ | Non-significant CAM data | |
| | 0.0 | 0.0 | | |

Fig. 13

| Index | Phase | Displacement | | |
|---|---|---|---|---|
| 0 | 0.0 | 0.0 | ← Starting point of CAM table | |
| 1 | 0.1 | 1.0 | | |
| 2 | 0.2 | 5.0 | | Significant CAM data (number) |
| ... | ... | ... | | |
| k | $\theta a$ | $\delta 2$ | | |
| ... | ... | ... | | |
| 3598 | 359.8 | 10.0 | Terminating point of CAM table | |
| 3599 | 359.9 | 5.0 | | |
| 3600 | 360.0 | 0.0 | | |
| | 0.0 | 0.0 | | Maximum number of CAM data |
| | 0.0 | 0.0 | Non-significant CAM data | |
| | ⋮ | ⋮ | | |
| | 0.0 | 0.0 | | |

520A

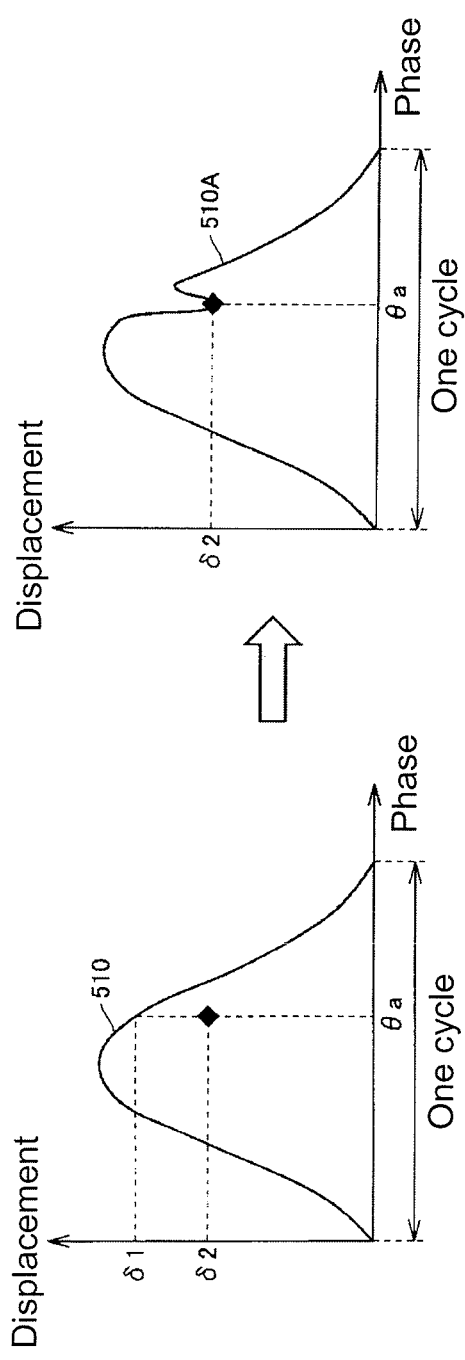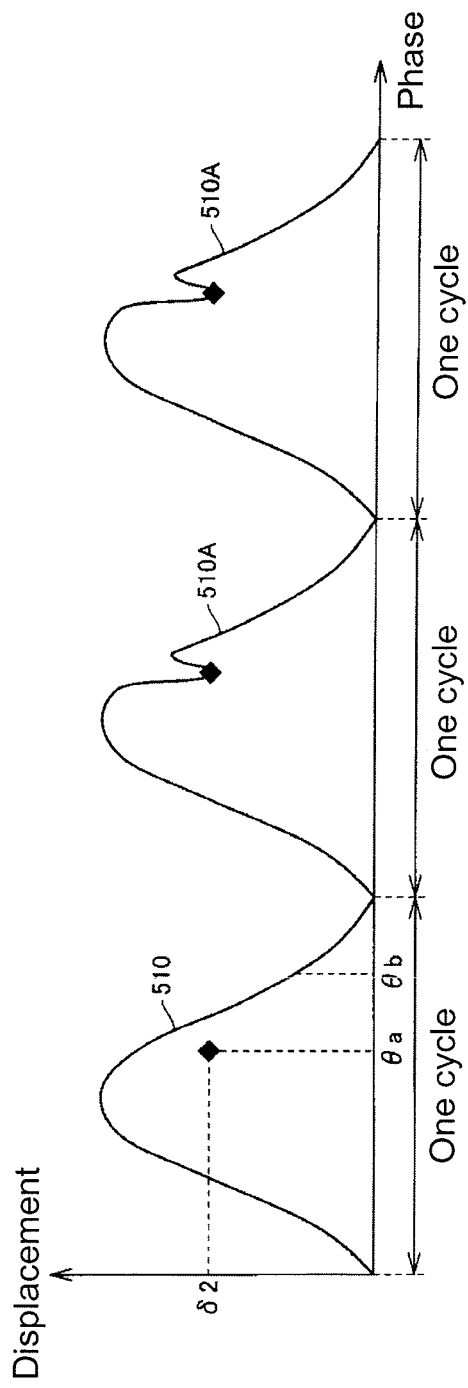
FIG. 14A
FIG. 14B

COMPUTATION UNIT, ASSISTANCE DEVICE, OUTPUT CONTROL METHOD, DISPLAY CONTROL METHOD, AND PROGRAM

TECHNICAL FIELD

The present invention relates to computation units of a programmable logic controller, assistance devices, output control methods, display control methods, and programs, and in particular to a computation unit for executing a motion control and a sequence control, an assistance device of the computation unit, an output control method in the computation unit, a display control method in the assistance device, and a program.

BACKGROUND ART

A PLC (Programmable Logic Controller) is, for example, configured by a plurality of units such as a CPU (Central Processing Unit) including a microprocessor for executing a user program, and an IO (Input Output) unit responsible for signal input from external switches and sensors and signal output to external relays and actuators. The PLC executes a control operation while exchanging data via a PLC system bus and/or field network among the units for every execution cycle of the user program.

The control of operations of machineries, facilities, and the like sometimes include a motion control for controlling the motion of a motor. Conventionally, in such motion control, control processing (execution of motion computation program) for periodically outputting a command value to a motor driver, which drives a motor, is typically carried out in a motion controller arranged separate from the PLC. However, increase in speed of the microprocessor and the communication network is progressing in the field of information technology. Thus, not only the user program, but also the motion computation program can be executed in one microprocessor in the PLC using such techniques.

For example, Patent Document 1 discloses a configuration of processing a motion control function of controlling a motor and a PLC function of executing a sequence computation (user program) with one CPU. More specifically, Patent Document 1 discloses executing "fixed-period motion control processing and each axis processing" and "high speed sequence processing" for every cycle of a basic clock, and furthermore, executing "low speed sequence processing" or "non-fixed period motion control processing" in the remaining time of each basic clock cycle.

An electronic cam is sometimes used in the motion control. The electronic cam realizes the operation of a mechanical CAM in electronic control, so that tooling change of the CAM, fine-tuning of the CAM shape, and the like can be freely and easily carried out. Non-patent Document 1 describes a CAM table for realizing the electronic cam. Non-patent Document 1 also describes a CAM variable.

Patent document 2 discloses an electronic cam control device. The electronic cam control device includes a stroke bottom dead point setting unit, an addition movement amount setting unit, a position command calculating unit, and a stroke bottom dead point changing unit. The addition movement amount setting unit sets addition movement data for changing the stroke bottom dead point position. When the stroke bottom dead point change command is input, the position command calculating unit sequentially adds the addition movement amount corresponding to the stroke bottom dead point position set in the stroke bottom dead point setting unit and the addition movement data set in the addition movement amount setting unit to a CAM positioning amount A, and sequentially outputs the addition result as a position command value with respect to an output shaft. When the stroke bottom dead point change command is input, the stroke bottom dead point changing unit sequentially adds the addition movement amount corresponding to the addition movement data set in the addition movement amount setting unit to the stroke bottom dead point position set in the stroke bottom dead point setting unit, and sequentially updates the stroke bottom dead point position set in the stroke bottom dead point setting unit with the addition result.

Patent Document 3 discloses a positioning control system of a motor. The positioning control system of the motor updates a movement actual time $R_{ti}$ for every frequency dividing period, obtains a dimensionless time $t_i$ from the updated movement actual time $R_{ti}$, and obtains a dimensionless position $S_{ij}$ corresponding to the dimensionless time $t_i$ using a CAM curve table. The positioning control system of the motor obtains an actual position $s_{ij}$ by multiplying a stroke $h_j$ to the obtained dimensionless position $S_{ij}$. The positioning control system of the motor carries out the computation of obtaining the actual position $s_{ij}$ for the selected N CAM curves. The positioning control system of the motor adds the obtained N actual positions $s_{ij}$. The positioning control system of the motor feedback controls a rotation position of the motor with a difference $s_{Ti}$-$s_{Ti-1}$ of an addition value $s_{Ti}$ and an addition value $s_{Ti-1}$ obtained in the previous frequency dividing period as a command value.

Patent Documents 4 to 6 disclose devices for synchronously driving a main shaft motor and a dependent shaft motor. Patent Document 7 discloses a manufacturing method and a manufacturing device (see FIG. 1) of a composite stretchable member using an electronic cam.

Patent Document 1: Japanese Unexamined Patent Publication No. 2007-140655
Patent Document 2: Japanese Unexamined Patent Publication No. 2006-293692
Patent Document 3: Japanese Unexamined Patent Publication No. 8-339218
Patent Document 4: Japanese Unexamined Patent Publication No. 8-126375
Patent Document 5: Japanese Unexamined Patent Publication No. 9-289788
Patent Document 6: Japanese Unexamined Patent Publication No. 10-174478
Patent Document 7: Japanese Unexamined Patent Publication No. 2010-260323
Non-patent Document 1: Technical Specification PLC open—Technical Committee 2—Task Force, Function blocks for motion control (Formerly Part 1 and Part 2), PLC open Working Draft, Version 1.99—Release for comments—till Aug. 16, 2010

SUMMARY OF THE INVENTION

Problems to be Solved by the Invention

In Patent Document 2, however, the stroke bottom dead point in the electronic cam can be set, but other areas cannot be set. Furthermore, Non-patent Document 1 does not disclose the specific content on the alteration of the CAM table.

Furthermore, in the operation of the electronic cam that carries out the synchronization control using the CAM table, in which the position relationship of the main shaft and the dependent shaft is defined, the position information defined in the CAM table may need to be fine-tuned while operating in each machine to absorb the difference in the synchronizing timing caused by the individual difference of the machine (machine difference). In the device in which a film roller is arranged on the main shaft as shown in FIG. 1 of Patent Document 7, the operation content of the dependent shaft may need to be changed in accordance with the extension/contraction of the film.

Conventionally, the CAM table is created with an electronic cam creating software that operates on a personal computer, and such CAM table is transferred to the motion controller to realize the electronic cam operation. With this method, fine-tuning of the device machine difference as described above, and the change in the operation of the dependent shaft during the electronic cam operation cannot be easily realized since it operates with the position information of the CAM table created in advance.

In view of the problems described above, it is an object of the invention of the present application to provide a computation unit of the PLC that can easily realize the fine-tuning of the device machine difference and the change in the operation of the dependent shaft during the electronic cam operation, an assistance device, an output control method, a display control method, and a program.

Means for Solving the Problem

According to one aspect of the present invention, a computation unit is a computation unit of a programmable logic controller configured to execute a motion control and a sequence control. The computation unit includes a processor; and a memory configured to store a CAM table and a program for performing the motion control using the CAM table in which a displacement of a driven shaft of an electronic cam is associated with each phase of a main shaft of the electronic cam. The processor is configured to output execution results of the program to an apparatus to be controlled associated with the driven shaft. The processor is configured to alter, when receiving a first command for altering at least either one of a plurality of phases or a displacement associated with the phase, at least either the phase or the displacement in the CAM table to a value that is on a basis of the first command. The processor is configured to execute, when the alteration is performed, the program using a post-alteration CAM table, and output the execution results to the apparatus to be controlled.

Preferably, the memory includes a non-volatile memory and a volatile memory. The non-volatile memory stores the pre-alteration CAM table. The processor is configured to read out the pre-alteration CAM table from the non-volatile memory and develop the read CAM table in the volatile memory. The processor is configured to perform, when receiving the first command after the development, the alteration on the CAM table developed in the volatile memory. The processor is configured to further store the post-alteration CAM table developed in the volatile memory in the non-volatile memory when receiving a second command.

Preferably, the pre-alteration CAM table includes a plurality of CAM data, each CAM data being configured by one displacement and one phase. The plurality of CAM data are divided to first CAM data that influences the operation of the electronic cam and second CAM data that does not influence the operation of the electronic cam. When receiving the first command, the processor alters at least either the phase or the displacement in the second CAM data to a value that is on the basis of the first command.

Preferably, the program includes a motion computation program, and a user program configured to perform processing of giving an instruction necessary for the execution of the motion computation program with respect to the motion computation program. Identification information is associated with each CAM data. The processor notifies the identification information to the user program when executing the operation of the electronic cam using the motion computation program.

Preferably, the processor is configured to determine whether or not the CAM data are arrayed such that the phases are in ascending order in the CAM table after reading out the pre-alteration CAM table from the non-volatile memory. The processor is configured to make a predetermined annunciation when determining that the CAM data are not arrayed such that the phases are in ascending order.

Preferably, the processor is configured to determine at a predetermined interval whether or not the CAM data are arrayed such that the phases are in ascending order in the CAM table used in the execution of the program regardless of whether or not the CAM table is altered when executing the program. The processor is configured to make a predetermined annunciation when determining that the CAM data are not arrayed such that the phases are in ascending order.

Preferably, the processor is configured to receive an instruction to select either a first altering mode or a second altering mode. The processor is configured to execute, upon receiving the first command when receiving the selection of the first altering mode, the program using the post-alteration CAM table in a period of the electronic cam in which the first command is received and in a period after the period and thereafter. The processor is configured to execute, upon receiving the first command when receiving the selection of the second altering mode, the program using the pre-alteration CAM table in the period of the electronic cam in which the first command is received and execute the program using the post-alteration CAM table in the period after the period and thereafter.

Preferably, the program includes a motion computation program, and a user program configured to perform processing of giving an instruction necessary for the execution of the motion computation program with respect to the motion computation program. The processor is configured to repeat the execution of the motion computation program every first fixed period. The processor is configured to repeat the user program every second fixed period, which is integral multiples of the first fixed period. The program configured to perform the alteration in the user program is described in a task of the first fixed period or a task of the second fixed period.

According to another aspect of the present invention, an assistance device is configured to create a user program executed by a computation unit of a programmable logic controller. The computation unit includes a memory stored with a first CAM curve in which a displacement of a driven shaft of an electronic cam is associated with each phase of a main shaft of the electronic cam, and a CAM table in which a displacement associated with one of the plurality of phases is altered. The assistance device includes a processor, memory stored with the first CAM curve and a support program configured to support the creation of the user program, a display, and a communication interface configured to communicate with the computation unit. The processor is configured to acquire the first CAM curve and the CAM table from the computation unit using the communication interface when receiving a predetermined command. The processor is configured to display on the display the first CAM curve stored in the memory or the acquired first CAM curve, and a second CAM curve based on the acquired CAM table.

Preferably, the support program stores in advance a threshold value. The processor is configured to calculate a surge of the driven shaft based on the CAM table. The processor is configured to display on the display an image indicating that the surge is greater than or equal to the threshold value when the calculated surge is greater than or equal to the threshold value.

Preferably, the support program stores in advance a threshold value. The processor is configured to calculate a speed of the driven shaft based on the CAM table. The processor is configured to display on the display an image indicating that the speed is greater than or equal to the threshold value when the calculated speed is greater than or equal to the threshold value.

Preferably, the support program stores in advance a threshold value. The processor is configured to calculate an acceleration of the driven shaft based on the CAM table. The processor is configured to display on the display an image indicating that the acceleration is greater than or equal to the threshold value when the calculated acceleration is greater than or equal to the threshold value.

Preferably, the processor is configured to display on the display an area exceeding the threshold value in a display mode different from an area not exceeding the threshold value in the second CAM curve.

According to still another aspect of the present invention, an output control method is a method in a computation unit of a programmable logic controller configured to execute a motion control and a sequence control. The computation unit stores a CAM table and a program for performing the motion control using the CAM table in which a displacement of a driven shaft of an electronic cam is associated with each phase of a main shaft of the electronic cam. The output control method includes the steps of: a processor of the computation unit outputting execution results of the program to an apparatus to be controlled associated with the driven shaft; the processor, when receiving a first command for altering at least either one of the plurality of phases or a displacement associated with the phase, altering at least either the phase or the displacement in the CAM table to a value that is on the basis of the first command; and the processor, when the alteration is performed, executing the program using a post-alteration CAM table, and outputting the execution results to the apparatus to be controlled.

According to yet another aspect of the present invention, a display control method is a method in an assistance device configured to create a user program executed by a computation unit of a programmable logic controller. The computation unit stores a first CAM curve in which a displacement of a driven shaft of an electronic cam is associated with each phase of a main shaft of the electronic cam, and a CAM table in which a displacement associated with one of the plurality of phases is altered, and the assistance device storing the first CAM curve and a support program configured to assist the creation of the user program in a memory. The display control method includes the steps of: a processor of the assistance device acquiring the first CAM curve and the CAM table from the computation unit using a communication interface when receiving a predetermined command; and the processor displaying on a display the first CAM curve stored in the memory or the acquired first CAM curve and a second CAM curve based on the acquired CAM table.

According to yet another aspect of the present invention, a program is configured to control a computation unit of a programmable logic controller configured to execute a motion control and a sequence control. The computation unit stores a CAM table and a program configured to perform the motion control using the CAM table in which a displacement of a driven shaft of an electronic cam is associated with each phase of a main shaft of the electronic cam. The program causes the computation unit to execute the steps of: outputting execution results of the program to an apparatus to be controlled associated with the driven shaft, altering, when receiving a first command for altering at least either one of a plurality of phases or a displacement associated with the phase, at least either the phase or the displacement in the CAM table to a value that is on the basis of the first command, and executing, when the alteration is performed, the program using a post-alteration CAM table, and outputting the execution results to the apparatus to be controlled.

According to yet another aspect of the present invention, a program is configured to control an assistance device configured to create a user program executed by a computation unit of a programmable logic controller. The computation unit stores a first CAM curve in which a displacement of a driven shaft of an electronic cam is associated with each phase of a main shaft of the electronic cam, and a CAM table in which a displacement associated with one of the plurality of phases is altered. The assistance device stores the first CAM curve and a support program configured to assist the creation of the user program in a memory. The program causes the assistance device to execute the steps of: acquiring the first CAM curve and the CAM table from the computation unit using a communication interface when receiving a predetermined command, and displaying on the display the first CAM curve stored in the memory or the acquired first CAM curve, and a second CAM curve based on the acquired CAM table.

Effect of the Invention

According to the present invention, the fine-tuning of the device machine difference and the change in the operation of the dependent shaft during the electronic cam operation can be easily realized.

BRIEF DESCRIPTION OF THE DRAWINGS

FIG. 10 is a view showing a structure array associated with CAM data;

FIG. 11 is a view showing a data structure of the CAM table;

FIG. 13 is a view showing a data structure of the CAM table of after rewriting the CAM table;

FIGS. 14A and 14B are views describing the rewriting processing of the CAM table;

MODE FOR CARRYING OUT THE INVENTION

Figure 1:
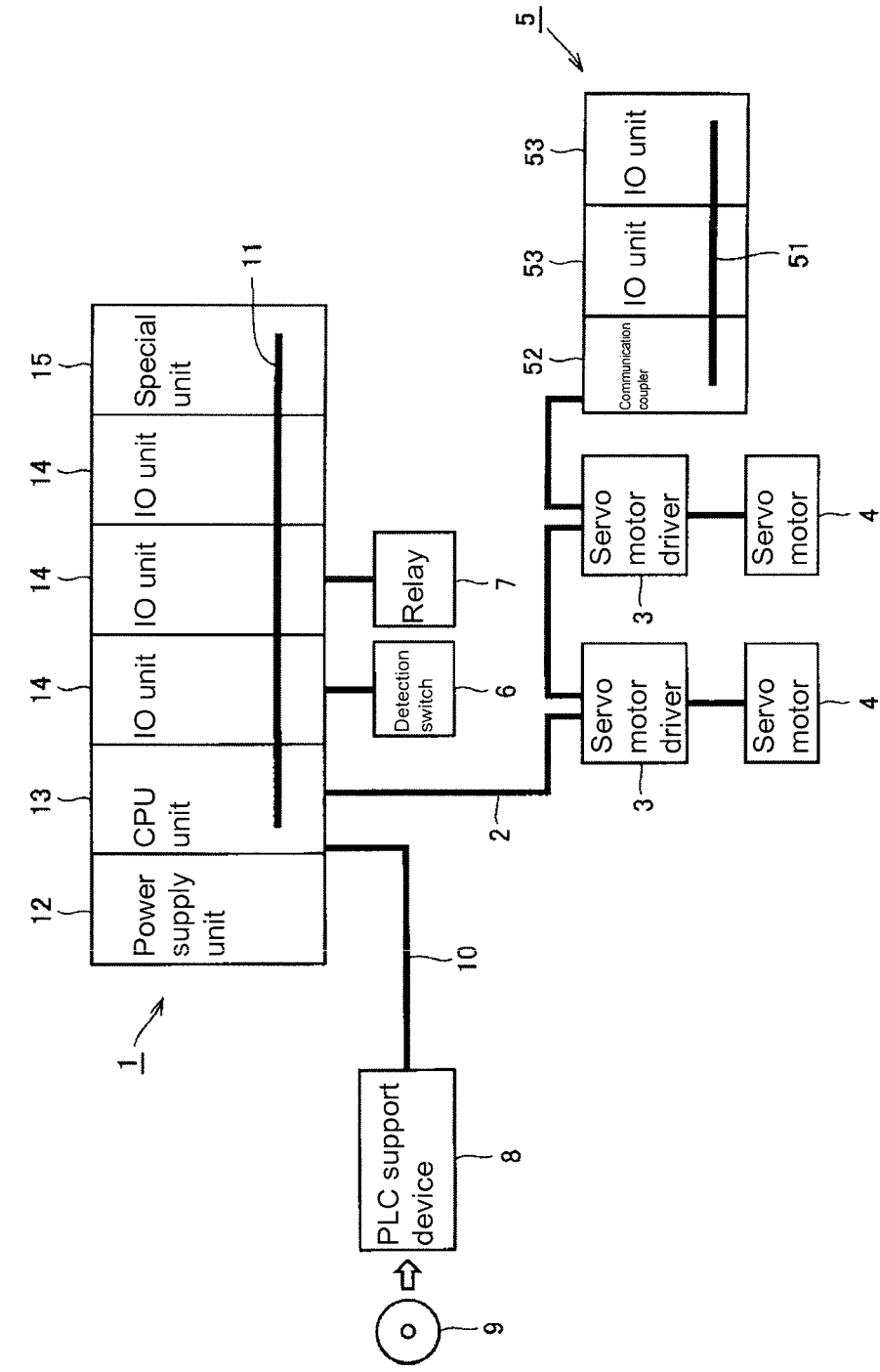
FIG. 1 is a schematic view showing a schematic configuration of a PLC system.

An embodiment of the present invention will be described in detail with reference to the drawings. The same reference numerals are denoted on the same or corresponding portions in the figures, and the description thereof will not be repeated.

<A. System Configuration>

A PLC according to the present embodiment has a motion control function for controlling the motion of the motor. First, a system configuration of a PLC 1 according to the present embodiment will be described with reference to FIG. 1.

FIG. 1 is a schematic view showing a schematic configuration of a PLC system according to the embodiment of the present invention. With reference to FIG. 1, a PLC system SYS includes the PLC 1, a servo motor driver 3 and a remote IO terminal 5 connected to the PLC 1 by way of a field network 2, and a detection switch 6 and a relay 7, which are field devices. A PLC support device 8 is also connected to the PLC 1 by way of a connection cable 10, and the like.

The PLC 1 includes a CPU unit 13, which executes main computation processing, one or more IO units 14, and a special unit 15. Such units are configured to be able to exchange data with each other through a PLC system bus 11. A power supply of an appropriate voltage is supplied to the units by a power supply unit 12. Each unit configured as the PLC 1 is provided by the PLC manufacturing company, and thus the PLC system bus 11 is generally uniquely developed by each PLC manufacturing company and used. As will be described later, the standard, and the like of the field network 2, on the other hand, are often publicized so that products from different manufacturing companies can be connected.

Figure 2:
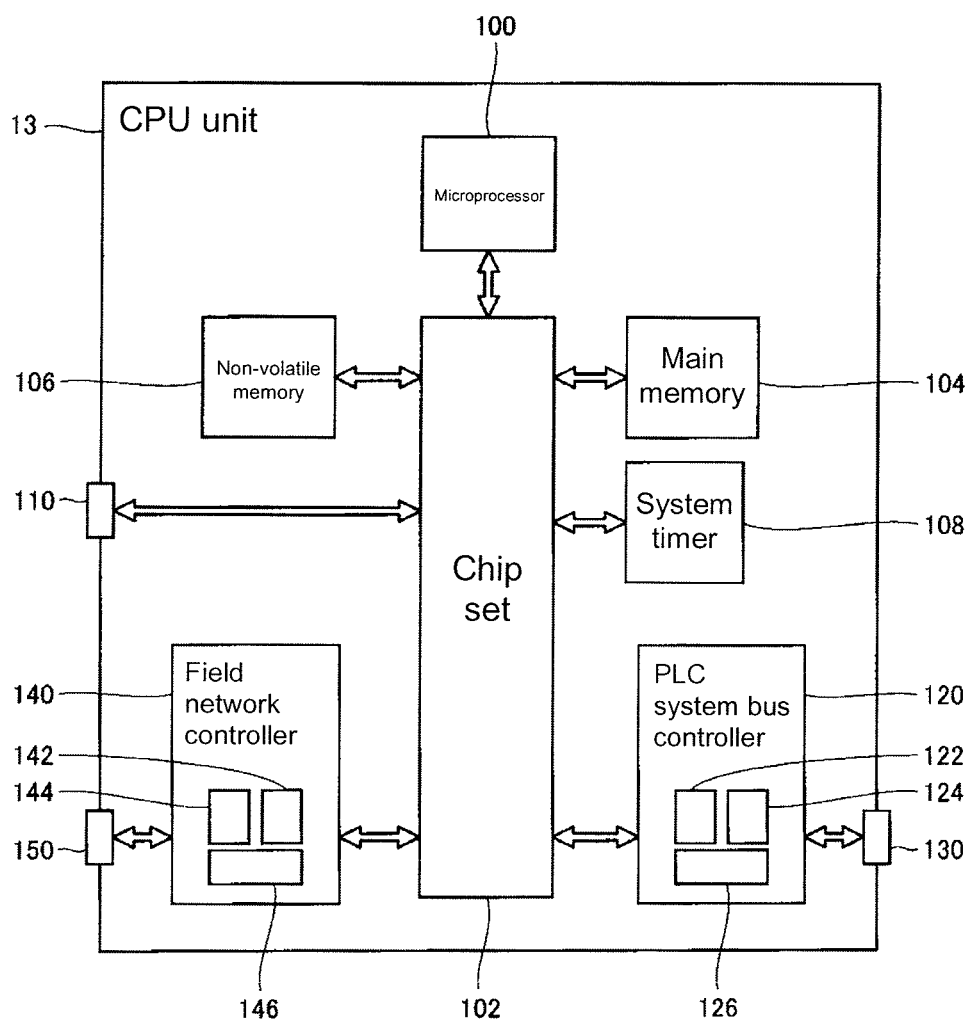
FIG. 2 is a schematic view showing a hardware configuration of a CPU unit.

The details of the CPU unit 13 will be described later with reference to FIG. 2.

The IO unit 14 is a unit associated with general input/output processing, and is responsible for the input/output of binarized data such as ON/OFF. In other words, the IO unit 14 collects information on whether a state (ON) in which a sensor such as the detection switch 6 is detecting some kind of object or a state (OFF) in which the sensor is not detecting any object. The IO unit 14 outputs either a command (ON) for activation or a command (OFF) for deactivation to an output destination such as the relay and the actuator.

The special unit 15 has functions that are not supported by the IO unit 14 such as input/output of analog data, temperature control, and communication by specific communication method.

The field network 2 transmits various types of data exchanged with the CPU unit 13. Various types of industrial Ethernet (registered trademark) can be typically used for the field network 2. For example, EtherCAT (registered trademark), Profinet IRT, MECHATROLINK (registered trademark)-III, Powerlink, SERCOS (registered trademark)-III, CIP Motion, and the like are known for the industrial Ethernet (registered trademark), and any one of the above may be adopted. The field network other than the industrial Ethernet (registered trademark) may also be used. For example, DeviceNet, CompoNet/IP (registered trademark), and the like may be used if the motion control is not carried out. In the PLC system SYS according to the present embodiment, the configuration of when adopting the EtherCAT (registered trademark), which is the industrial Ethernet (registered trademark), for the field network 2 will be typically illustrated in the present embodiment.

In FIG. 1, the PLC system SYS including both the PLC system bus 11 and the field network 2 is illustrated, but a system configuration mounted with only one of the PLC system bus 11 or the field network 2 may be adopted. For example, all the units may be connected with the field network 2. Alternatively, the field network 2 may not be used, and the servo motor driver 3 may be directly connected to the PLC system bus 11. Furthermore, the communication unit of the field network 2 may be connected to the PLC system bus 11, and communication with the apparatus connected to the field network 2 from the CPU unit 13 through such communication unit may be carried out.

The servo motor driver 3 is connected to the CPU unit 13 through the field network 2, and drives a servo motor 4 according to a command value from the CPU unit 13. More specifically, the servo motor driver 3 receives command values such as position command value, speed command value, and torque command value at a constant period from the PLC 1. The servo motor driver 3 also acquires an actual measurement value related to the operation of the servo motor 4 such as position, speed (typically calculated from the difference of current position and previous position), and torque from a detector such as a position sensor (rotary encoder) and a torque sensor connected to the shaft of the servo motor 4. The servo motor driver 3 then sets the command value from the CPU unit 13 as a target value, and performs the feedback control with the actual measurement value as a feedback value. In other words, the servo motor driver 3 adjusts the current for driving the servo motor 4 so that the actual measurement value approaches the target value. The servo motor driver 3 is sometimes referred to as a servo motor amplifier.

FIG. 1 shows a system example in which the servo motor 4 and the servo motor driver 3 are combined, but other configurations, for example, a system in which a pulse motor and a pulse motor driver are combined may be adopted.

The remote IO terminal 5 is also connected to the field network 2 of the PLC system SYS shown in FIG. 1. The remote IO terminal 5 basically performs processing associated with the general input/output processing, similar to the IO unit 14. More specifically, the remote IO terminal 5 includes a communication coupler 52 for performing processing associated with data transmission on the field network 2, and one or more IO units 53. Such units are configured to be able to exchange data with each other through a remote IO terminal bus 51.

The PLC support device 8 will be described later.

<B. Hardware Configuration of CPU Unit>

The hardware configuration of the CPU unit 13 will now be described with reference to FIG. 2. FIG. 2 is a schematic view showing a hardware configuration of the CPU unit 13 according to the embodiment of the present invention. With reference to FIG. 2, the CPU unit 13 includes a microprocessor 100, a chip set 102, a main memory 104, a non-volatile memory 106, a system timer 108, a PLC system bus controller 120, a field network controller 140, and a USB connector 110. The chip set 102 and the other components are respectively connected through various buses.

The microprocessor 100 and the chip set 102 are typically configured according to versatile computer architecture. In other words, the microprocessor 100 interprets and executes an instruction code sequentially provided according to an internal clock from the chip set 102. The chip set 102 exchanges internal data with various components connected thereto and also generates the instruction code necessary for the microprocessor 100. Furthermore, the chip set 102 has a function of cashing data, and the like obtained as a result of executing the computation processing in the microprocessor 100.

The CPU unit 13 includes the main memory 104 and the non-volatile memory 106 as storage units.

The main memory 104 is a volatile storage region (RAM) and holds various types of programs to be executed by the microprocessor 100 after turning ON the CPU unit 13. The main memory 104 is also used as a work memory when the microprocessor 100 executes the various types of programs. Devices such as DRAM (Dynamic Random Access Memory) and SRAM (Static Random Access Memory) are used for the main memory 104.

The non-volatile memory 106 holds, in a non-volatile manner, data such as real time OS (Operating System), system program, user program, motion computation program, and data such as system setting parameter of the PLC 1. Such programs and data are copied onto the main memory 104, as necessary, so as to be accessible by the microprocessor 100. A semiconductor memory such as a flash memory can be used for the non-volatile memory 106. Alternatively, a magnetic recording medium such as a hard disc drive, an optical recording medium such as a DVD-RAM (Digital Versatile Disk Random Access Memory), and the like can also be used.

The system timer 108 generates an interrupt signal for every constant period and provides the same to the microprocessor 100. The interrupt signal is typically generated in a plurality of different periods depending on the specification of the hardware, but the interrupt signal may be set to be generated in an arbitrary period by the OS (Operating System), BIOS (Basic Input Output System), and the like. The control operation for every motion control cycle, as will be described later, is realized using the interrupt signal generated by the system timer 108.

The CPU unit 13 includes the PLC system bus controller 120 and the field network controller 140 as communication circuits.

A buffer memory 126 functions as a transmission buffer of the data (hereinafter also referred to as "output data") output to another unit through the PLC system bus 11, and a reception buffer of the data (hereinafter also referred to as "input data") input from another unit through the PLC system bus 11. The output data created by the computation processing of the microprocessor 100 is primitively stored in the main memory 104. The output data to be transferred to a specific unit is read out from the main memory 104, and primarily held in the buffer memory 126. The input data transferred from another unit is primarily held in the buffer memory 126, and then transferred to the main memory 104.

A DMA control circuit 122 performs transfer of the output data from the main memory 104 to the buffer memory 126, and transfer of the input data from the buffer memory 126 to the main memory 104.

A PLC system bus control circuit 124 performs processing of transmitting the output data of the buffer memory 126 and processing of receiving the input data and storing the input data in the buffer memory 126 with another unit connected to the PLC system bus 11. The PLC system bus control circuit 124 typically provides functions of the physical layer and the data link layer in the PLC system bus 11.

The field network controller 140 controls the exchange of data through the field network 2. In other words, the field network controller 140 controls the transmission of the output data and the reception of the input data according to the standard of the field network 2 being used. As described above, the field network 2 complying with the EtherCAT (registered trademark) standard is adopted in the present embodiment, and hence the field network controller 140 including hardware for carrying out the normal Ethernet (registered trademark) communication is used. In the EtherCAT (registered trademark) standard, a general Ethernet (registered trademark) controller that realizes the communication protocol complying with the normal Ethernet (registered trademark) standard can be used. However, the Ethernet (registered trademark) controller of a special specification corresponding to the communication protocol of a dedicated specification different from the normal communication protocol is used depending on the type of industrial Ethernet (registered trademark) adopted for the field network 2. Furthermore, if the field network other than the industrial Ethernet (registered trademark) is adopted, a dedicated field network controller corresponding to such standard is used.

A DMA control circuit 142 performs transfer of the output data from the main memory 104 to the buffer memory 146, and transfer of the input data from the buffer memory 146 to the main memory 104.

A field network control circuit 144 performs processing of transmitting the output data of the buffer memory 146 and processing of receiving the input data and storing the input data in the buffer memory 146 with another device connected to the field network 2. The field network control circuit 144 typically provides functions of the physical layer and the data link layer in the field network 2.

The USB connector 110 is an interface for connecting the PLC support device 8 and the CPU unit 13. Typically, the programs, and the like transferred from the PLC support device 8 and executable by the microprocessor 100 of the CPU unit 13 are retrieved to the PLC 1 through the USB connector 110.

<C. Software Configuration of CPU Unit>

The software group for providing various functions according to the present embodiment will now be described with reference to FIG. 3. The instruction code contained in the software is read out at an appropriate timing, and executed by the microprocessor 100 of the CPU unit 13.

Figure 3:
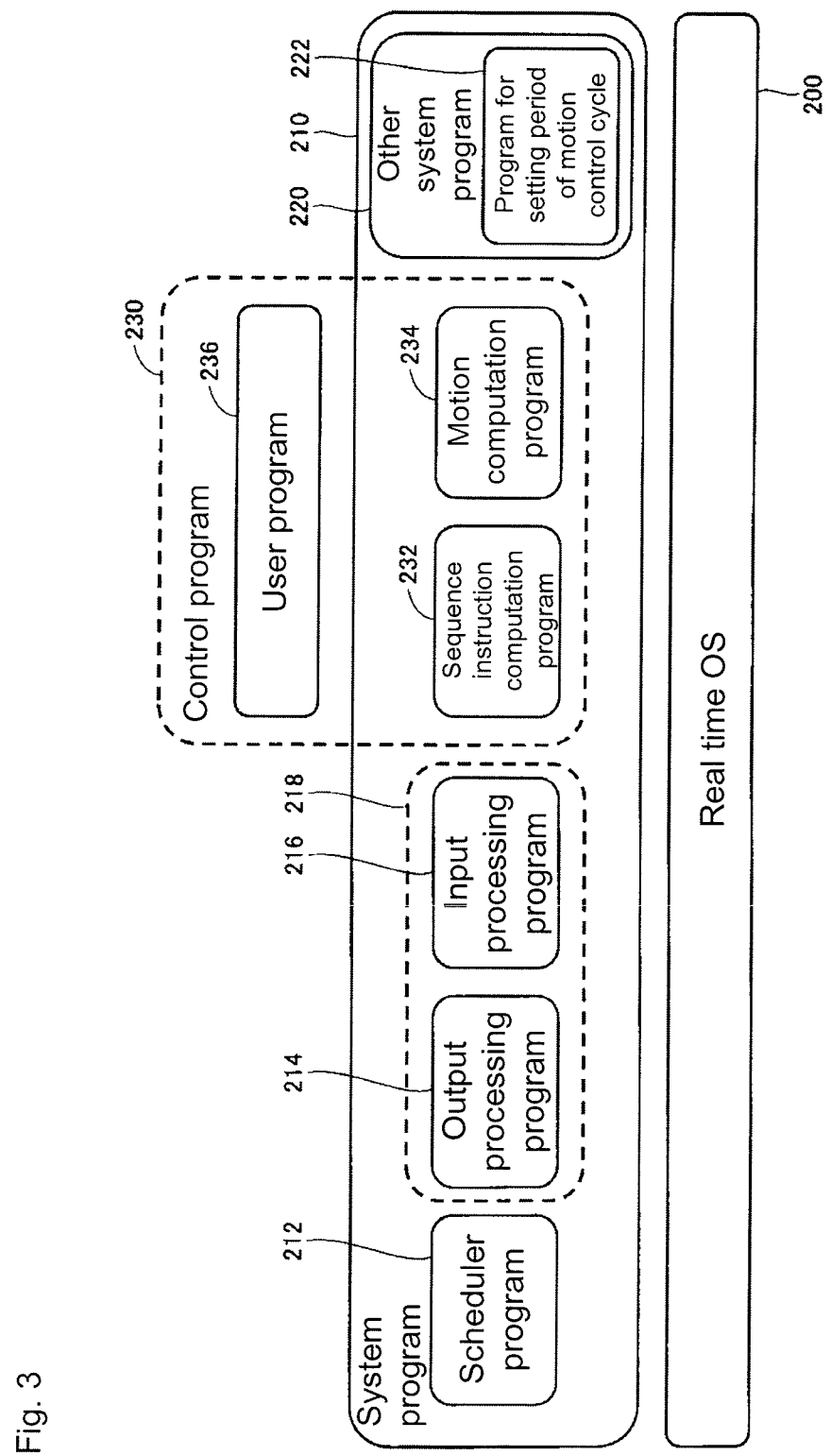
FIG. 3 is a schematic view showing a software configuration executed by the CPU unit.

FIG. 3 is a schematic view showing the software configuration executed by the CPU unit 13 according to the embodiment of the present invention. With reference to FIG. 3, the software executed by the CPU unit 13 has three hierarchies, a real time OS 200, a system program 210, and a user program 236.

The real time OS 200 is designed according to the computer architecture of the CPU unit 13, and provides the basic execution environment for the microprocessor 100 to execute the system program 210 and the user program 236. The real time OS is typically provided by the manufacturing company of the PLC, the specialized software company, and the like.

The system program 210 is a software group for providing the functions of the PLC 1. Specifically, the system program 210 includes a scheduler program 212, an output processing program 214, an input processing program 216, a sequence instruction computation program 232, a motion computation program 234, and other system program 220. Generally, the output processing program 214 and the input processing program 216 are successively (integrated manner) executed, and thus the output processing program and the input processing program are sometimes collectively referred to as an IO processing program 218.

The user program 236 is created according to the control purpose of the user. In other words, the user program 236 is a program arbitrarily designed according to a target line (process), and the like to be controlled using the PLC system SYS.

As will be hereinafter described, the user program 236 cooperatively operates with the sequence instruction computation program 232 and the motion computation program 234 to realize the control purpose of the user. In other words, the user program 236 uses instructions, functions, function modules, and the like provided by the sequence instruction computation program 232 and the motion computation program 234 to realize a programmed operation. Thus, the user program 236, the sequence instruction computation program 232, and the motion computation program 234 are sometimes collectively referred to as a control program 230.

The microprocessor 100 of the CPU unit 13 executes the system program 210 and the user program 236 stored in the storage unit in the above manner.

Hereinafter, each program will be more specifically described.

As described above, the user program 236 is created according to the control purpose (e.g., target line and process) of the user. The user program 236 is typically in an object program format executable by the microprocessor 100 of the CPU unit 13. The user program 236 is generated when the source programs described by the ladder language, and the like are complied in the PLC support device 8, and the like. The generated user program 236 in the object program format is transferred from the PLC support device 8 to the CPU unit 13 through the connection cable 10, and stored in the non-volatile memory 106, and the like.

The scheduler program 212 controls the start of the processing and the resuming of the processing after the processing is interrupted in each execution cycle for the output processing program 214, the input processing program 216, and the control program 230. More specifically, the scheduler program 212 controls the execution of the user program 236 and the motion computation program 234.

In the CPU unit 13 according to the present embodiment, the execution cycle (motion control cycle) of a constant period suited for the motion computation program 234 is adopted as a common cycle for the entire processing. It is thus difficult to complete all processing within one motion control cycle, and hence the processing is divided to the processing in which the execution is to be completed in each motion control cycle and the processing in which the execution may be carried out over a plurality of motion control cycles according to priority, and the like of the processing to be executed. The scheduler program 212 manages the execution order, and the like of the divided processing. More specifically, the scheduler program 212 executes the program with higher priority first within each motion control cycle period.

The output processing program 214 rearranges the output data generated by the execution of the user program 236 (control program 230) to a format suited for transfer to the PLC system bus controller 120 and/or the field network controller 140. If the PLC system bus controller 120 or the field network controller 140 requires an instruction to execute the transmission from the microprocessor 100, the output processing program 214 issues such instruction.

The input processing program 216 rearranges the input data received by the PLC system bus controller 120 and/or the field network controller 140 to a format suited for use by the control program 230.

The sequence instruction computation program 232 is a program that is called out when a certain type of sequence instruction used in the user program 236 is executed, and executed to realize the content of such instruction.

The motion computation program 234 is a program executed according to the instruction from the user program 236, and calculates a command value to output to the servo motor driver 3 and the motor driver such as the pulse motor driver.

Other system program 220 collectively indicates the program group for realizing the various types of functions of the PLC 1 other than the programs individually shown in FIG. 3. The other system program 220 includes a program 222 for setting the period of the motion control cycle.

The period of the motion control cycle can be appropriately set according to the control purpose. Typically, the user inputs the information specifying the period of the motion control cycle to the PLC support device 8. The input information is then transferred from the PLC support device 8 to the CPU unit 13. The program 222 for setting the period of the motion control cycle stores the information from the PLC support device 8 in the non-volatile memory 106, and sets the system timer 108 so that the interrupt signal is generated in the period of the motion control cycle specified from the system timer 108. When the program 222 for setting the period of the motion control cycle is executed at the time of turning ON the CPU unit 13, the information specifying the period of the motion control cycle is read out from the non-volatile memory 106, and the system timer 108 is set according to the read information.

A value of time indicating the period of the motion control cycle, information (number or character) that specifies one of a plurality of options prepared in advance related to the period of the motion control cycle, and the like, may be adopted for the format of the information specifying the period of the motion control cycle.

In the CPU unit 13 according to the present embodiment, the means for setting the period of the motion control cycle corresponds to an element used to arbitrarily set the period of the motion control cycle such as the communication unit with the PLC support device 8 used to acquire the information specifying the period of the motion control cycle, the program 222 for setting the period of the motion control cycle, and the configuration of the system timer 108 configured to be able to arbitrarily set the period of the interrupt signal defining the motion control cycle.

The real time OS 200 provides an environment for switching the plurality of programs with elapse of time and executing the relevant program. In the PLC 1 of the present embodiment, an output preparation interruption (P) and a field network transmission interruption (X) are initially set as an event (interruption) for outputting (transmitting) the output data generated by the program execution of the CPU unit 13 to other units or other devices. When the output preparation interruption (P) or the field network transmission interruption (X) occurs, the real time OS 200 switches the executing target in the microprocessor 100 from the program being executed at the time the interruption occurred to the scheduler program 212. The real time OS 200 executes the program included in the other system program 210 if the scheduler program 212 and the program which execution is controlled by the scheduler program 212 are not executed at all. Such program includes a program related to the communication processing through the connection cable 10 (USB), and the like between the CPU unit 13 and the PLC support device 8.

<D. Outline of Motion Control>

A typical configuration contained in the user program 236 described above will now be described. The user program 236 includes an instruction to periodically determine whether or not a condition to start the control related to the motion of the motor is met. For example, the logic is to determine whether or not a work to be subjected to some kind of procedure by the drive force of the motor is transported to a predetermined processing position. The user program 236 further includes an instruction to start the motion control in accordance with the determination that the condition to start the control is met. The execution of the motion instruction is instructed with the start of the motion control. The motion computation program 234 corresponding to the instructed motion instruction is activated, and the initial processing necessary to calculate the command value with respect to the motor is first executed for every execution of the motion computation program 234. In the motion control cycle same as the initial processing, the command value in the first cycle is calculated. Therefore, the initial processing and the first command value calculation processing become the processing to be performed by the activated motion computation program 234 in the first execution. Thereafter, the command value in each cycle is sequentially calculated.

Figure 4:
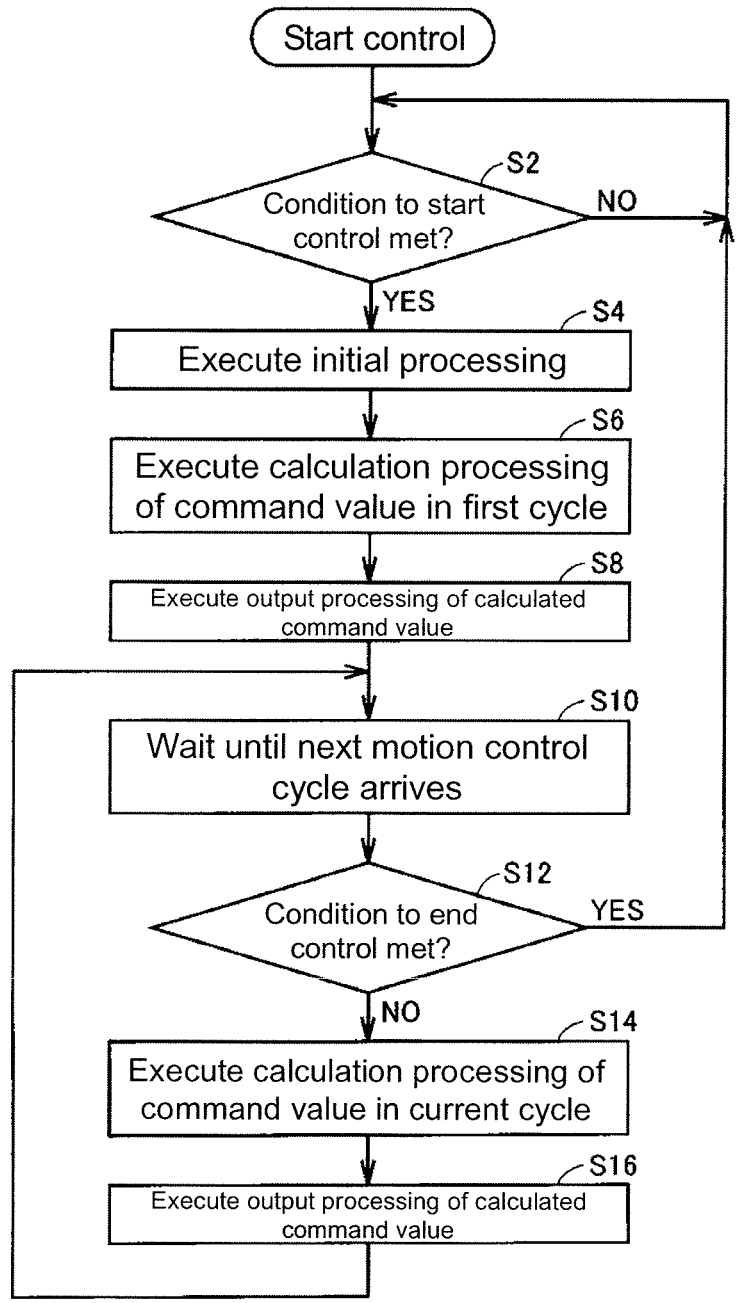
FIG. 4 is a flowchart showing a schematic processing procedure of a motion control provided by a control program.

FIG. 4 is a flowchart showing a schematic processing procedure of the motion control provided by the control program 230 (user program 236, sequence instruction computation program 232, and motion computation program 234) according to the embodiment of the present invention. With reference to FIG. 4, the microprocessor 100 periodically determines whether or not the condition to start the control related to the motion of the motor is met (step S2). The determination on whether or not the condition to start the control is met is made by the user program 236 and the sequence instruction computation program 232. If the condition to start the control is not met (NO in step S2), the determination of step S2 is repeated.

If the condition to start the control is met (YES in step S2), the microprocessor 100 executes the initial processing related to the motion control (step S4). The initial processing includes calculation processing of start position coordinate, end position coordinate, initial speed, initial acceleration, path, and the like of the motion of the motor. The microprocessor 100 then executes the calculation processing of the command value in a first cycle (step S6). Furthermore, the microprocessor 100 executes an output processing of the calculated command value (step S8).

Thereafter, the microprocessor 100 waits until the next motion control cycle arrives (step S10). The microprocessor 100 then periodically determines whether or not a condition to end the control related to the motion of the motor is met (step S12). If the condition to end the control is met, this means that the servo motor 4 has reached the end position. If the condition to end the control is met (YES in step S12), the processing of step S2 and the subsequent steps are again repeated. In this case, the motion computation program 234 being activated is maintained in the inactive state until a new condition to start the control is met.

If the condition to end the control is not met (NO in step S12), the microprocessor 100 executes the calculation processing of the command value in the current cycle (step S14). Furthermore, the microprocessor 100 executes the output processing of the calculated command value (step S16). The processing of step S10 and the subsequent steps are then repeated.

Hereinafter, the function module for realizing the motion control is also referred to as "motion control function module". Specifically, the "motion control function module" is a function module that executes the output of the command value to the shaft and the acquisition of the information from the shaft necessary for realizing the motion operation desired by the user at a constant period using the target values (position, speed, torque, etc.) given by the user program. The "motion control function module" is an open loop type controller that outputs the command value to the servo driver. The instruction (function block (hereinafter also referred to as "FB") that gives an instruction to the motion control function module is referred to as "motion control instruction".

Figure 5:
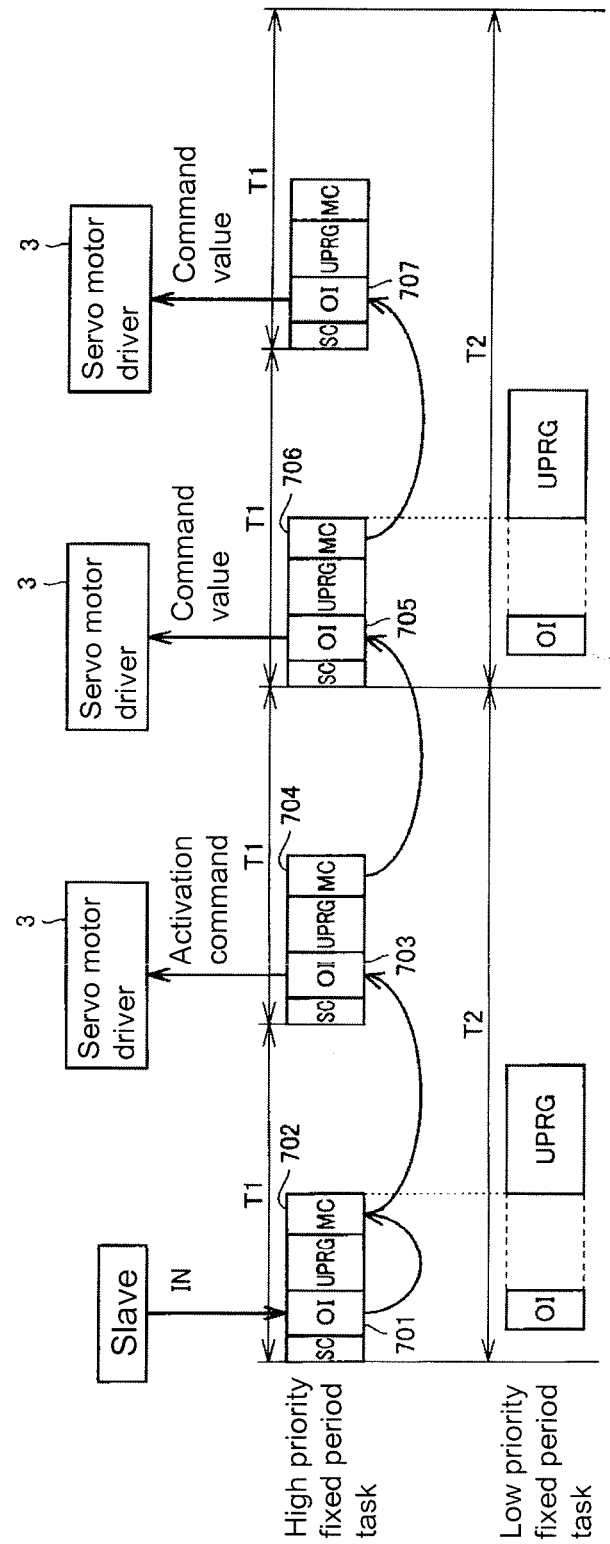
FIG. 5 is a view showing a relationship of a motion control instruction and a task.

FIG. 5 is a view showing a relationship of the motion control instruction and the task. Specifically, FIG. 5 is a view showing data flow. With reference to FIG. 5, the motion control function module is executed during a high priority fixed period task. The motion control instruction can be described in the high priority fixed period task or the low priority fixed period task. The high priority fixed period task is a task having the highest priority in the CPU unit 13.

If the high priority fixed period task becomes executable during the execution of the low priority fixed period task, the low priority fixed period task is once interrupted, and the high priority fixed period task is executed. After the high priority fixed period task is completed, the execution of the low priority fixed period task is resumed. A period T2 of the low priority fixed period task is an integral multiple of a period T1 of the high priority fixed period task. FIG. 5 shows a case of T2=2T1.

In FIG. 5, the scheduler program is noted as "SC", the output/input processing program is noted as "OI", the user program 236 is noted as "UPRG", and the motion computation program 234 is noted as "MC". Furthermore, in FIG. 5, different reference numbers 701 to 707 are denoted to identify each OI and each MC for the sake of convenience of explanation.

The order of the rough flow of data is (1) slave→701→MC 702→OI 703→servo motor driver 3, (2) MC 704→OI 705→servo motor driver 3, and (3) MC 706→OI 707→servo motor driver 3. This will be specifically described below.

During the execution of the PLC 1, the microprocessor 100 is in a state of being able to execute at least the output/input processing program (output processing program 214 and input processing program 216), the user program 236, and the motion computation program 234. Strictly speaking, the real time OS 200 holds the process (or sled) related to the respective program in an executable state, and each program is executed at an appropriate timing and in an appropriate order by having the scheduler program 212 use the real time OS 200 and the hardware resource (system timer 108, etc.). Thus, start/interruption/end, and the like of the execution related to the respective program are controlled by the scheduler program 212.

In FIG. 5, the field network controller 140 (see FIG. 2) receives the motion control input data and stores the motion control input data in a field network reception buffer (not shown) of the main memory 104, and/or the PLC system bus controller 120 receives the motion control input data and stores the motion control input data in a PLC system bus reception buffer (not shown) of the main memory 104 on the basis of the input (IN) from the slave to the OI 701. The CPU unit 13 is set as the master, and the respective units other than the CPU unit 13 are set as the slave.

Activation command data or motion command value data is output in accordance with the instruction of the IO processing program 218. More specifically, the activation command data and the motion command value data stored in the work region (not shown) of the control program of the main memory 104 are transferred to a field network transmission buffer (not shown) of the main memory 104. Following the data transfer to the field network transmission buffer, the field network controller 140 transmits the activation command data or the motion command value data to the servo motor driver 3.

In the input (IN) from the slave to the OI 701, input data that is used for the computation in the user program 236 but not used for the computation in the motion computation program 234 is also input. Furthermore, even if the user program output data generated by the execution of the user program 236 is the output data that is not used for the computation in the motion computation program 234, the user program output data is transmitted to the IO processing program 218 and output in the processing of the OI.

The "motion control cycle" according to the present embodiment is the period of execution and communication of the motion computation program 234, that is, the cycle of a series of processing executed in the period of providing the motion command value data to the servo motor driver 3.

<E. Electronic Cam>

The electronic cam operation will be described hereinafter as a function of the synchronization control. The "synchronization control" refers to controlling the position of the driven shaft (control target shaft) in synchronization with the position of the main shaft (input shaft). One of the position of the encoder for the full closed loop control, the command positions of the servo driver and the virtual servo driver, as well as the feedback positions of the encoder, the servo driver, and the virtual servo driver can be specified for the main shaft. The "electronic cam operation" refers to the function of performing the CAM operation at a control period according to the CAM pattern set by the CAM table to be described later.

Since the CPU unit 13 controls the output by computing in synchronization with the input for every control period, the computation result may become greater than the highest speed that can be output with the motion control function module. In this case, however, the CPU unit 13 performs the output at the highest speed without considering it as an error. The CPU unit 13 distributes and outputs the movement amount that is lacking due to the saturation at the highest speed in the next control period and thereafter.

Figure 6:
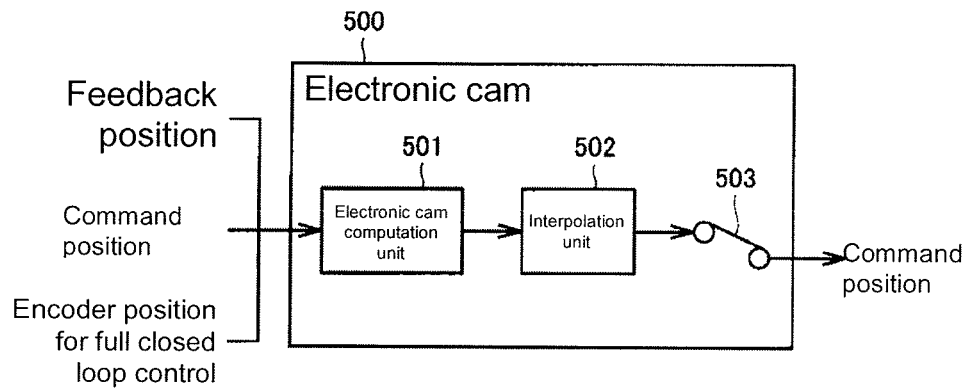
FIG. 6 is a view showing the function outline of an electronic cam.

FIG. 6 is a view showing the function outline of the electronic cam. With reference to FIG. 6, an electronic cam 500 includes an electronic cam computation unit 501, an interpolation unit 502, and a switch unit 503. The electronic cam computation unit 501 is input with a preselected position among the position of the encoder for full closed loop control, the command positions of the servo driver and the virtual servo driver, as well as the feedback positions of the encoder, the servo driver, and the virtual servo driver.

The electronic cam computation unit 501 outputs the displacement of the driven shaft to the interpolation unit 502 on the basis of the phase of the input main shaft and the CAM table. The interpolation unit 502 performs interpolation processing using the value output from the electronic cam computation unit 501. The interpolation unit 502 outputs the value (command value) after the interpolation processing through the switch unit 503. The CAM table is stored in advance in the non-volatile memory 106, and is developed in the main memory 104 with power ON.

Figure 7:
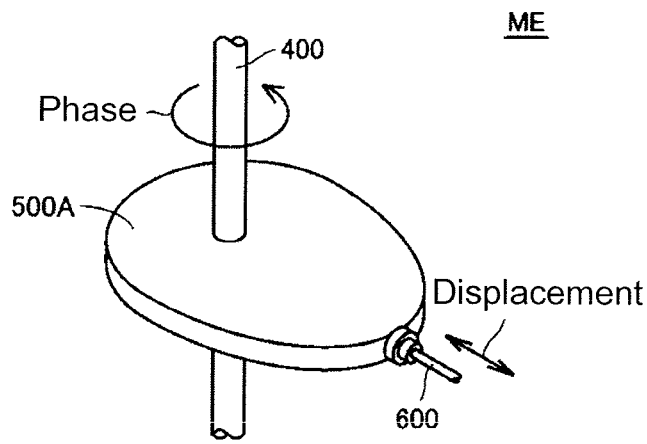
FIG. 7 is a view for visually describing the operation of the electronic cam.

FIG. 7 is a view for visually describing the operation of the electronic cam 500. Specifically, FIG. 7 is a view showing a CAM mechanism ME including a mechanical CAM 500A represented with a CAM curve based on the CAM table. With reference to FIG. 7, the CAM mechanism ME includes a main shaft 400, the mechanical CAM 500A, and a driven shaft 600. The mechanical CAM 500A is fixed to the main shaft 400, and rotates with the rotation of the main shaft 400. The driven shaft 600 performs a linear motion with the rotation of the mechanical CAM 500A. That is, in the CAM mechanism ME, the driven shaft 600 displaces (outputs) when the phase (input) of the main shaft is changed. The electronic cam 500 realizes the input/output in the CAM mechanism ME by software.

Figure 8:
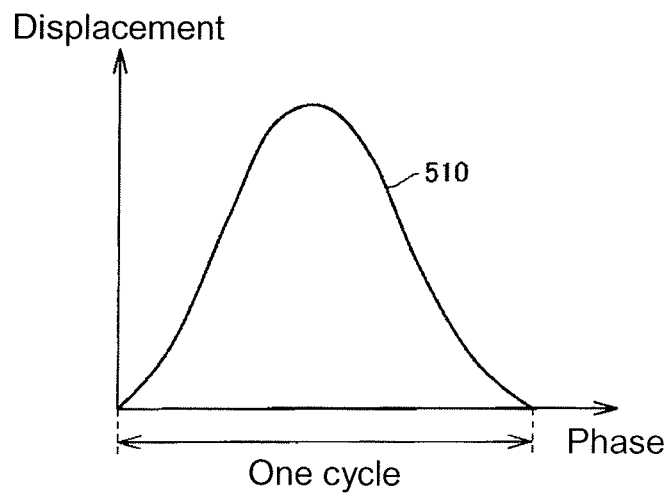
FIG. 8 is a view showing a CAM curve of the electronic cam.

FIG. 8 is a view showing a CAM curve 510 of the electronic cam 500. With reference to FIG. 8, in the CAM curve 510, the displacement increases from zero as the phase increases from zero, and the displacement reaches the peak at the phase (180 degrees) in a half cycle. Thereafter, the displacement reduces as the phase increases, and the displacement becomes zero at the phase (360 degrees) in one cycle. The CAM curve 510 is merely an illustration, and the am curve used in the PLC system SYS is not limited thereto.

Figure 9:
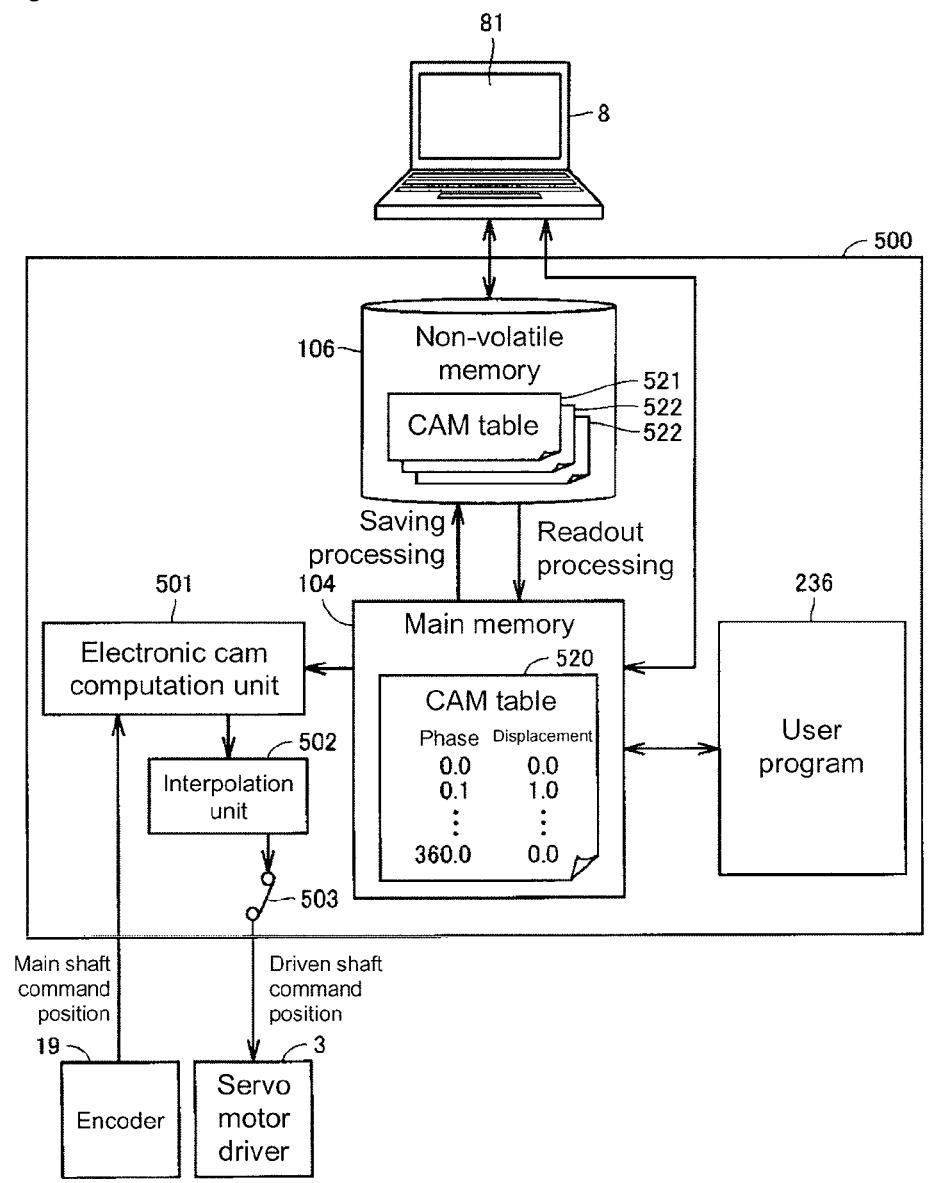
FIG. 9 is a view showing a system configuration associated with the electronic cam.

FIG. 9 is a view showing a system configuration associated with the electronic cam 500. FIG. 9 is a view that more specifically shows the electronic cam 500 of FIG. 6, and is also a view showing a configuration of the motion controller for executing the operation of the electronic cam. With reference to FIG. 9, the system associated with the electronic cam 500 is realized by the electronic cam computation unit 501, the interpolation unit 502, the switch unit 503, the main memory 104, the non-volatile memory 106, and the user program 236.

The non-volatile memory 106 stores a plurality of CAM tables 520, 521, 522. FIG. 9 shows a state in which the CAM table 520 is developed in the main memory 104 from the non-volatile memory 106. FIG. 9 also shows an example in which the encoder position is input from the encoder 19 to the electronic cam 500. The details of the CAM table 520 will be described later. Hereinafter, the CAM table 520 is also referred to as "CAM table No. 1" for the sake of convenience of explanation.

FIG. 10 is a view showing a structure array associated with the CAM data. With reference to FIG. 10, a structure array 530 is a structure array for managing the CAM table 520 stored in the non-volatile memory 106 in the main memory 104. In the structure array 530, an identifier of the CAM table, an index, and a value of the phase (or value of the displacement) are associated. For example, the first description of the structure array 530 indicates that the phase at which the index in the CAM table No. 1 (i.e., CAM table 520) is No. 1 is "0.0". The index will be described later.

FIG. 11 is a view showing a data structure of the CAM table 520. More specifically, FIG. 11 is a view showing the data structure of the CAM table created by the CAM table editing software stored in the PLC support device 8.

With reference to FIG. 11, the CAM table 520 is data in which the displacement of the driven shaft of the electronic cam is associated with each phase of the main shaft of the electronic cam. That is, the CAM table 520 is discrete data. When linear interpolation is performed using the data in the CAM table 520, the CAM curve 510 shown in FIG. 8 is obtained. The linear interpolation is carried out by the interpolation unit 502 of FIG. 6.

In the CAM table 520, the phases from 0 degree to 360 degree can be described by dividing into maximum number of CAM data. In the CAM table 520, the phase is described by 0.1 degree. The "CAM data" is the data configured by one displacement and one phase. That is, the CAM table 520 includes a plurality of CAM data. The unit of the displacement δ is, for example, "mm".

Furthermore, the first CAM data in which the respective values of the phase and the displacement are zero in the CAM table is the starting point of the CAM table. This area is assumed as index No. 0. The CAM data one before (i.e., one above) the area where the respective values of the phase and the displacement becomes zero the next time is the terminating point of the CAM table. That is, the significant CAM data is from the starting point of the CAM table to the terminating point of the CAM table (data in a phase range of 0 degree to 360 degrees). The "significant CAM data" is the CAM data that influences the operation of the electronic cam. The number of the index, which is the identifier of the CAM data, is given to the significant CAM data. The number of the index is given in ascending order in the CAM table.

The CAM data after (i.e., below) the terminating point of the CAM table is the CAM data that does not influence the operation of the electronic cam (i.e., non-significant CAM data). Both the phase and the displacement do not need to be zero in the non-significant CAM data. The number of non-significant CAM data is specified by the CAM table editing software.

FIG. 13 is a view showing a data structure of the CAM table 520A after rewriting the CAM table 520. As described above, the rewriting processing of the CAM table refers to the processing of rewriting the data of the CAM table 520 developed from the non-volatile memory 106 to the main memory 104. Even if the CAM table 520 is developed to perform such rewriting processing, the CAM table 520 (i.e., original data) is still stored in the non-volatile memory 106.

With reference to FIG. 13, when receiving a command for altering the displacement δ at a phase θa of the CAM table 520 from δ1 to δ2, the CPU unit 13 alters the displacement associated with the phase θa in the CAM table 520 from δ1 to δ2. That is, the microprocessor 100 of the CPU unit 13 overwrites the displacement δ1 associated with the phase θa in the CAM table 520 developed in the main memory 104 to δ2. The phase θa is an arbitrary phase among the phases from 0 degree to 360 degrees.

The microprocessor 100 stores the CAM table 520A temporarily stored in the main memory 104 in the non-volatile memory 106 when receiving an instruction defined in advance. The CAM table 520 and the CAM table 520A are thus stored in the non-volatile memory 106.

FIG. 14 is a view describing the rewriting processing of the CAM table 520. FIG. 14A is a view showing the CAM curve 510 based on the CAM table 520 of before the rewrite and a CAM curve 510A based on the CAM table 520A of after the rewrite. FIG. 14B is a view describing the operation of the electronic cam at before and after the rewrite of the CAM table.

With reference to FIG. 14A, the CAM curve 510A based on the CAM table 520A is a curve (specifically, collection of lines) having continuity between the displacements for the phases before and after the phase θa in the CAM table 520A. With reference to FIG. 14B, when receiving a command for altering the displacement at a time point (θa<θb) associated with the phase θb, the CPU unit 13 operates the driven shaft, which is the control target, according to the CAM curve 510A based on the CAM table 520A in the next control period and thereafter.

The rewrite of the CAM table may be a method in which the user directly describes the program, or a method in which a GUI (Graphic User Interface) of table format is used.

Figure 15:
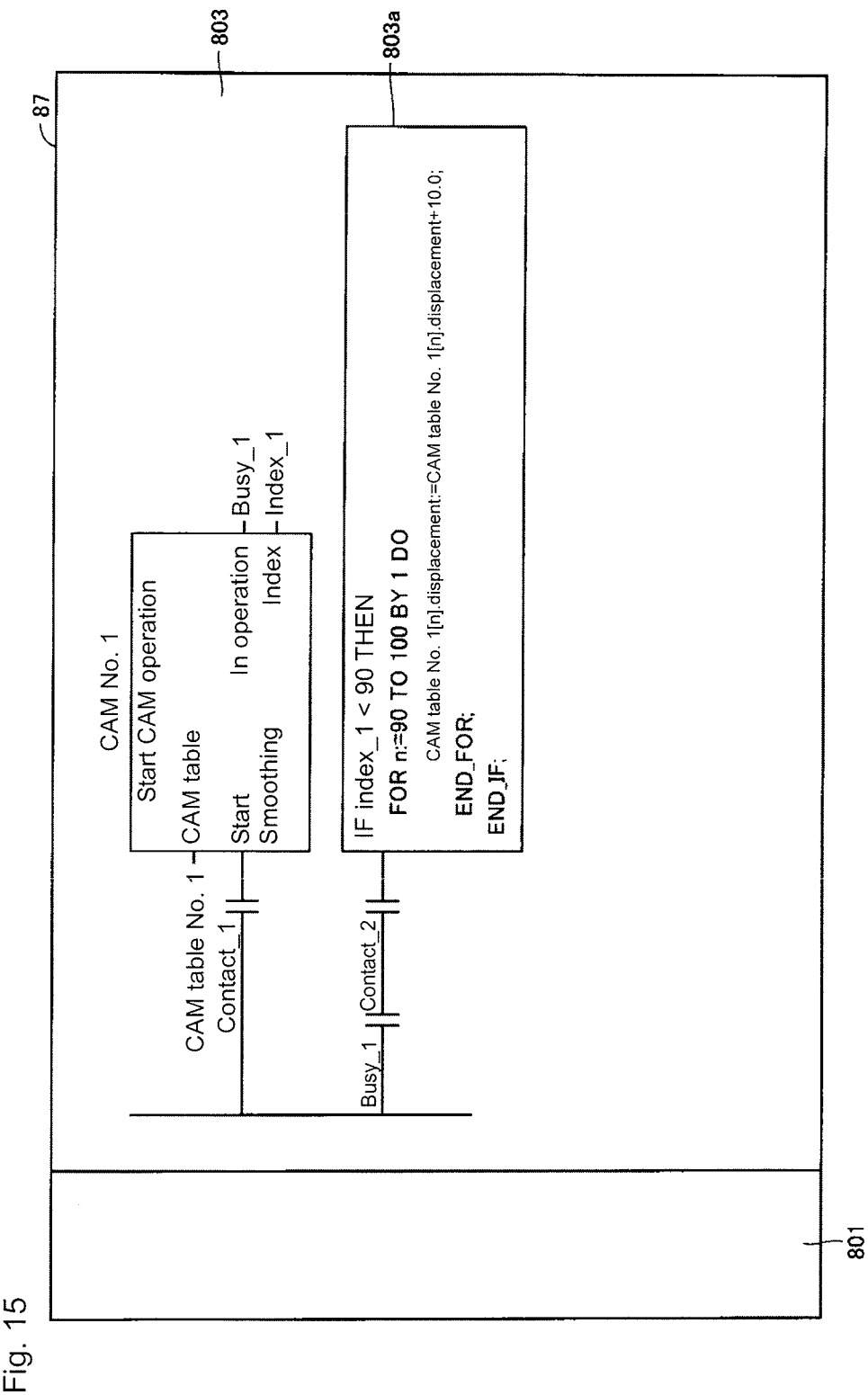
FIG. 15 is a view showing a user interface for rewriting the CAM table in a method in which a user directly describes the program.

FIG. 15 is a view showing a user interface for rewriting the CAM table in the method in which the user directly describes the program. FIG. 15 also shows a description example of a rewrite instruction of when the ST (Structure Text) language and the ladder language generally used in the PLC controller are used.

With reference to FIG. 15, the rewrite of the CAM table is carried out using the PLC support device 8. Specifically, the user makes a data input while referencing a display 87 of the PLC support device 8, so that the rewrite of the CAM table 520 developed in the main memory 104 is executed.

Two regions 801, 803 are displayed in the display 87. The region 801 is a menu region in which selectable items are displayed.

The program by the user is described in a box 803a in the region 803. That is, the processing content to be executed is displayed in the box 803a. According to a specific example, in the region 803a is described, using the ST language and the ladder language, an instruction to add 10 to the displacements of index No. 90 to No. 100 of the CAM table No. 1 when output parameters "busy_1" indicating that the electronic cam No. 1 (i.e., electronic cam 500) is in execution and "contact_2" are TRUE, and the CAM data of the CAM table used for the command for the driven shaft is smaller than the index No. 90. In this case, the microprocessor 100 executes the processing described in the region 803.

Figure 12:
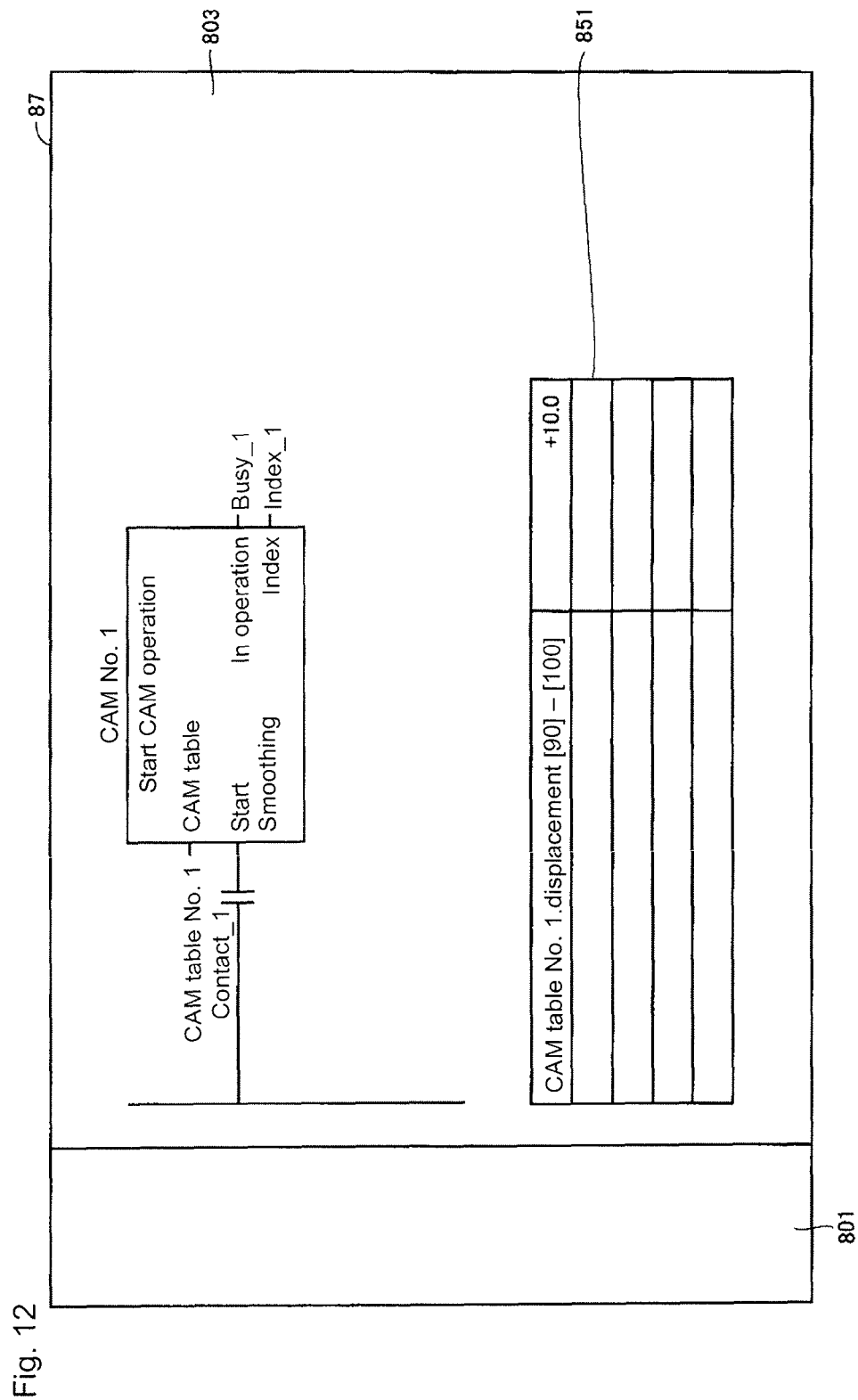
FIG. 12 is a view showing a user interface for rewriting the CAM table in a method in which the GUI of table format is used.

FIG. 12 is a view showing a user interface for rewriting the CAM table in the method in which the GUI of table format is used. With reference to FIG. 12, a window 851, which is the GUI of table format, is displayed in the display 87. The window 851 is a region for the user to input. The user describes in the window 851 a command for increasing the respective displacements of the CAM data of index No. 90 to No. 100 of the CAM table No. 1 by 10 mm. In the case of FIG. 12, the user can easily describe the command since the GUI is used.

Figure 16:
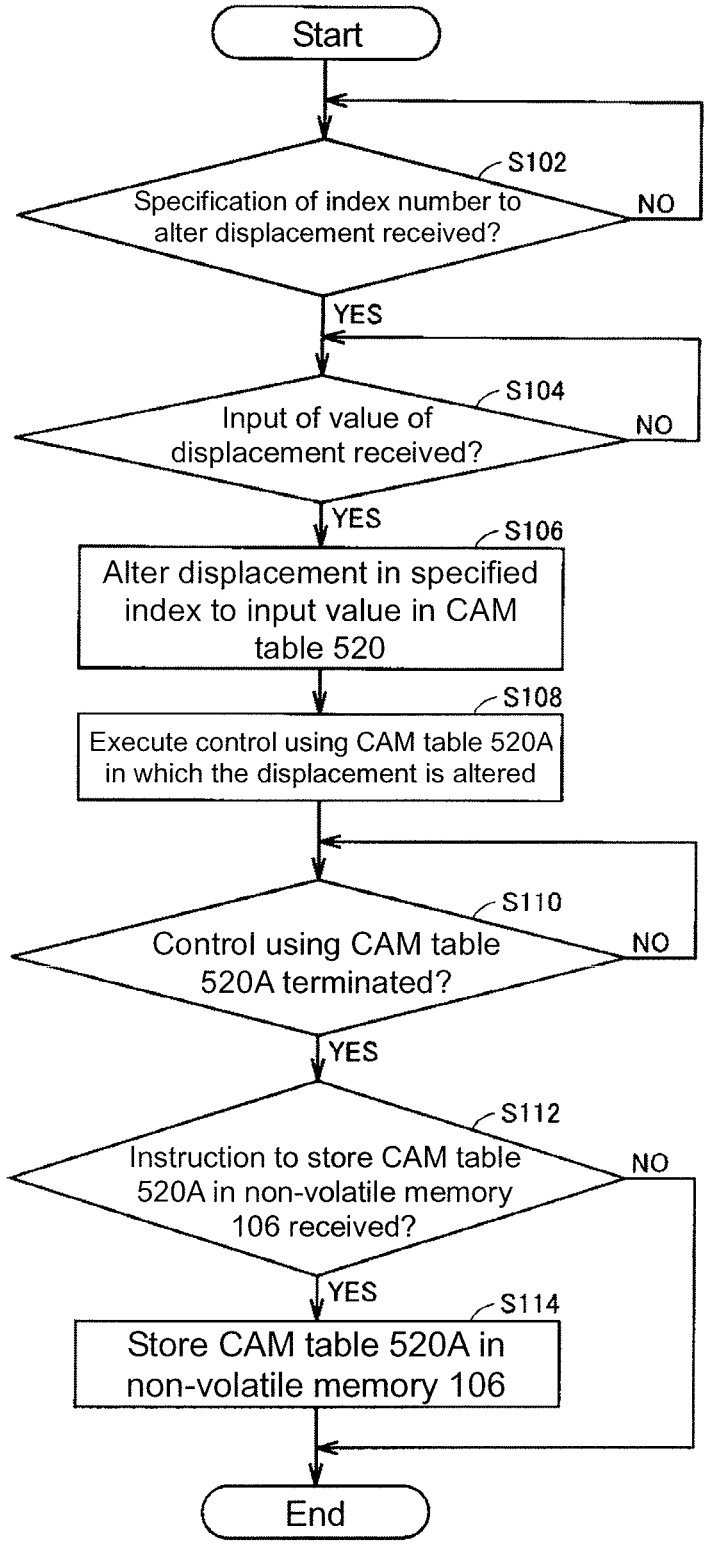
FIG. 16 is a flowchart showing a procedure for rewriting the CAM data.

FIG. 16 is a flowchart showing a procedure for rewriting the displacement of the CAM data in the CAM table 520. With reference to FIG. 16, the microprocessor 100 determines whether or not a specification of an index number to alter the displacement in the CAM table 520 is received in step S102. When determining that the specification of the index number is received (YES in step S102), the microprocessor 100 determines whether or not an input of the value of displacement is received in step S104. When determining that the specification of the index number is not received (NO in step S102), the microprocessor 100 proceeds the processing to step S102.

When determining that the input of the value of displacement is received (YES in step S104), the microprocessor 100 alters the displacement at the specified index in the CAM table 520 to the input value in step S106. When determining that the input of the value of displacement is not received (NO in step S104), the microprocessor 100 proceeds the processing to step S104.

In step S108, the microprocessor 100 executes a control using the CAM table 520A in which the displacement is altered. In step S110, the microprocessor 100 determines whether or not the control using the CAM table 520A is terminated. When determining that the control is terminated (YES in step S110), the microprocessor 100 determines whether or not an instruction to save the CAM table 520A is received in step S112. When determining that the control is not terminated (NO in step S110), the microprocessor 100 proceeds the processing to step S110.

When determining that the instruction to save the CAM table 520A is received (YES in step S112), the microprocessor 100 stores the CAM table 520A in the non-volatile memory 106 in step S114. When determining that the instruction to save the CAM table 520A is not received (NO in step S112), the microprocessor 100 terminates the series of processing without storing the CAM table 520A in the non-volatile memory 106.

The control instruction to rewrite the CAM table may be such that the control instruction to rewrite the CAM table is described in the high priority fixed period task or the control instruction is described in the low priority fixed period task.

Figure 17:
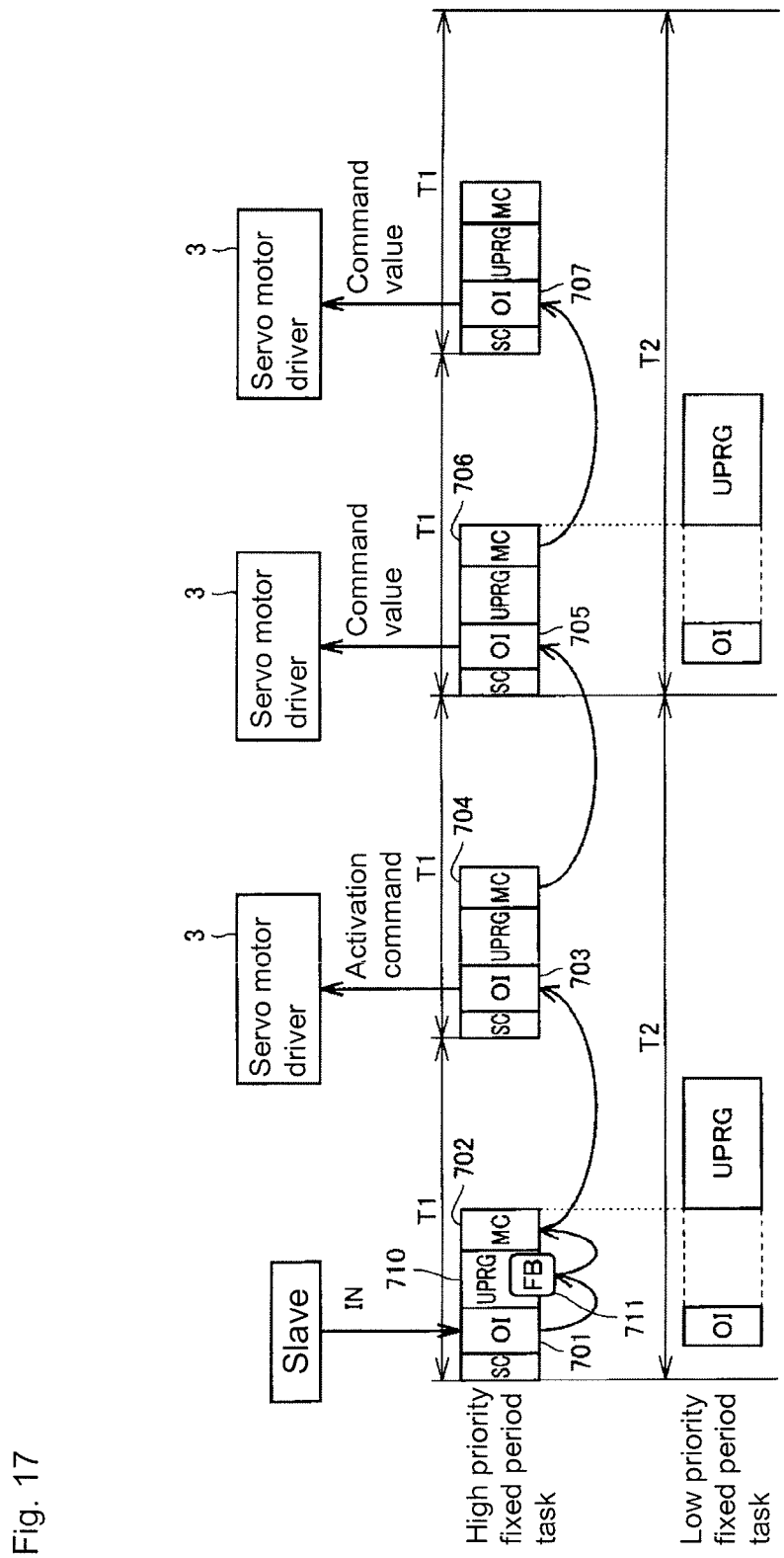
FIG. 17 is a view showing a data flow of when the control instruction to rewrite the CAM table is described in a high priority fixed period task.

FIG. 17 is a view showing a data flow of when the control instruction to rewrite the CAM table is described in the high priority fixed period task. With reference to FIG. 17, control instruction FB711 to rewrite the CAM table is described in a UPRG 710. The order of the rough flow of data in this case is (1) slave→OI 701→FB 711→MC 702→OI 703→servo motor driver 3, (2) MC 704→OI 705→servo motor driver 3, (3) MC 706→OI 707→servo motor driver 3.

Figure 18:
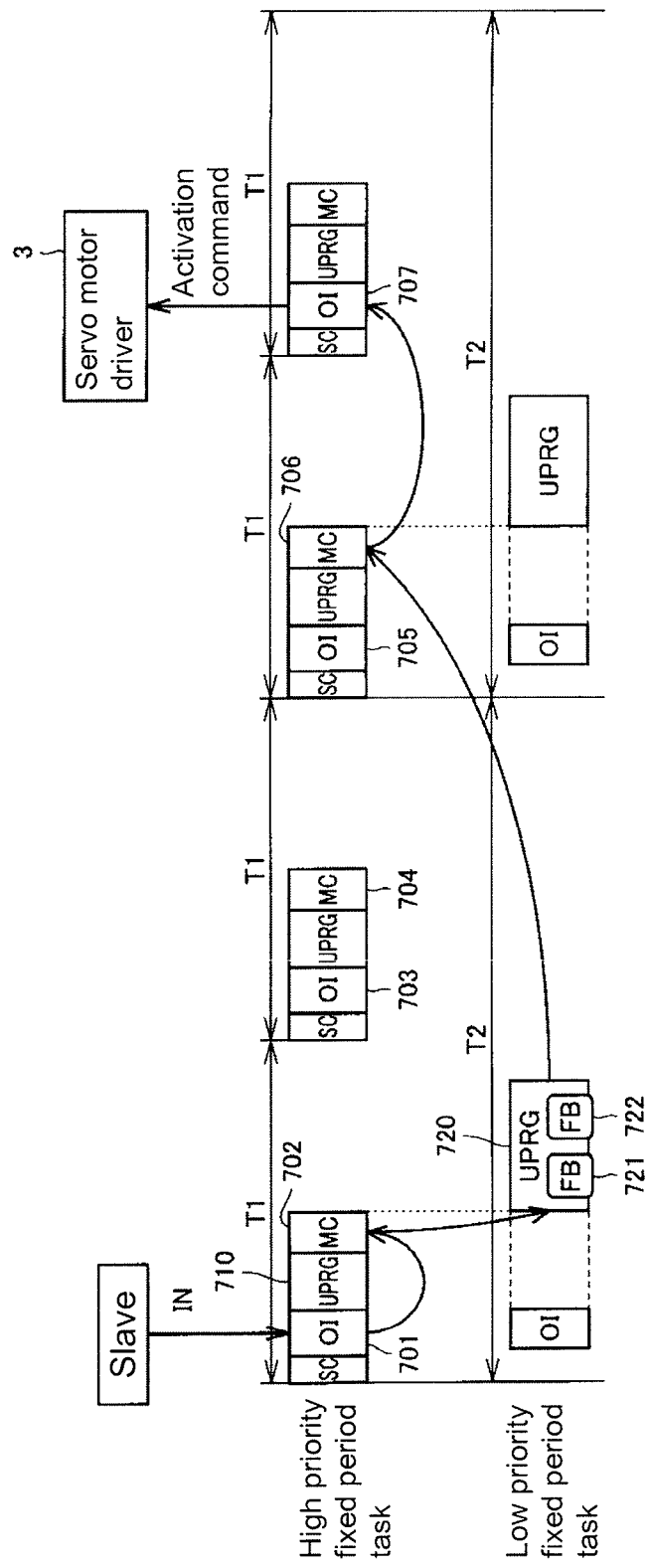
FIG. 18 is a view showing a data flow of when the control instruction to rewrite the CAM table is described in a low priority fixed period task.

FIG. 18 is a view showing a data flow of when the control instruction to rewrite the CAM table is described in the low priority fixed period task. With reference to FIG. 18, control instructions FB (Function Block) 721, 722 to rewrite the CAM table are described in a UPRG 720. The order of the rough flow of data in this case is slave→OI 701→MC 702→UPRG 720 (FB 721, 722)→OI 706→OI 707→servo motor driver 3.

Other functions executable by the CPU unit 13 will be hereinafter described. The rewrite of the CAM data in the CAM table can be carried out not only during the operation of the CAM but also while the CAM is stopped.

(e1. Masking Process)

As shown in FIG. 14B, when receiving the command for altering the displacement at the time point (θa<θb) associated with the phase θb, the CPU unit 13 operates the driven shaft, which is the control target, according to the CAM curve 510A based on the CAM table 520A in the next control period and thereafter. However, the CPU unit 13 may carry out the processing that uses the CAM table 520 in the next control period in which the relevant command for altering the displacement is received, and uses the CAM table 520A in the control period after the next control period in which the relevant command for altering the displacement is received. This will be more specifically described below. Hereinafter, the processing is also referred to as "masking process" for the sake of convenience of explanation.

The microprocessor 100 of the CPU unit 13 receives from the user an instruction to select either a mode (also referred to as "first altering mode") of not executing the masking process and a mode (also referred to as "second altering mode") of executing the masking process. If the command for altering the displacement is received when the selection of mode to not execute the masking process is received, the microprocessor 100 executes the control program 230 using the post-alteration CAM table 520A in the period of the electronic cam of when the command is received and the period after such period and thereafter. That is, when the displacement is altered as described above, the microprocessor 100 immediately executes the processing reflecting such alteration.

If the command for altering the displacement is received when the selection of mode to execute the masking process is received, the microprocessor 100 executes the control program 230 using the pre-alteration CAM table 520 in the period of the electronic cam of when the command is received, and executes the control program 230 using the post-alteration CAM table 520A in the period after the relevant period and thereafter.

Figure 19:
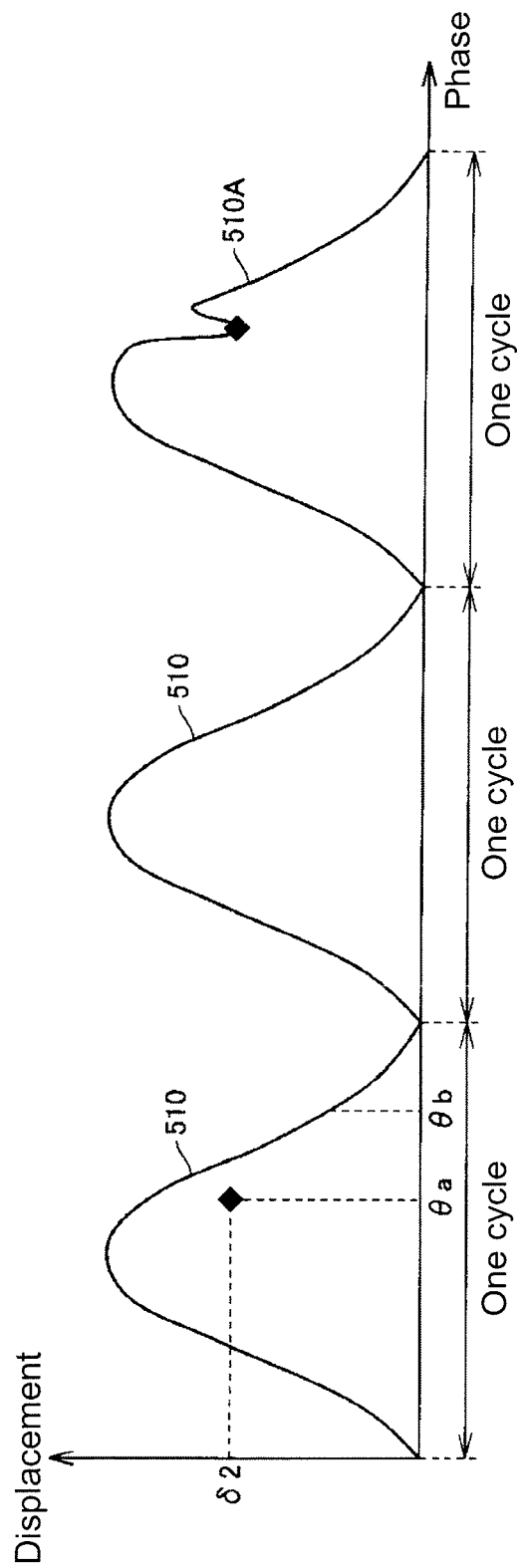
FIG. 19 is a view describing an operation of the electronic cam when performing the processing that uses the pre-alteration CAM table in the next control period in which the command for altering the displacement at the phase θa is received, and uses another CAM table in the control period after the next control period in which the relevant command is received.

FIG. 19 is a view describing the operation of the electronic cam when the processing is carried out that uses the CAM table 520 in the next control period in which the command for altering the displacement at the phase θa is received and uses the CAM table 520A in the control period after the next control period in which the relevant command is received. That is, FIG. 19 is a view describing the operation of the electronic cam when the mode of executing the masking process is selected.

With reference to FIG. 19, when receiving the command for altering the displacement at the time point associated with the phase θb, the CPU unit 13 operates the driven shaft, which is the control target, based on the CAM curve 510 associated with the pre-alteration CAM table 520 in the next CAM period. Furthermore, in the next CAM period, the CPU unit 13 operates the driven shaft, which is the control target, based on the CAM curve 510A associated with the post-alteration CAM table 520A.

According to such processing, the control using the CAM table of after the rewrite is no longer performed in the CAM period including the timing at which at least the rewrite is carried out. The CPU unit 13 thus can carry out a stable control.

The function of the masking process is an optional function, and is not a function the CPU unit 13 must have.

(e2. Rewrite of Phase)

In the description made above, an example of rewriting the displacement of the CAM data in the CAM table has been described, but this is not the sole case. The CPU unit 13 may rewrite the phase instead of rewriting the displacement. Alternatively, the CPU unit 13 may rewrite not only the displacement but may rewrite the displacement and the phase.

Figure 20:
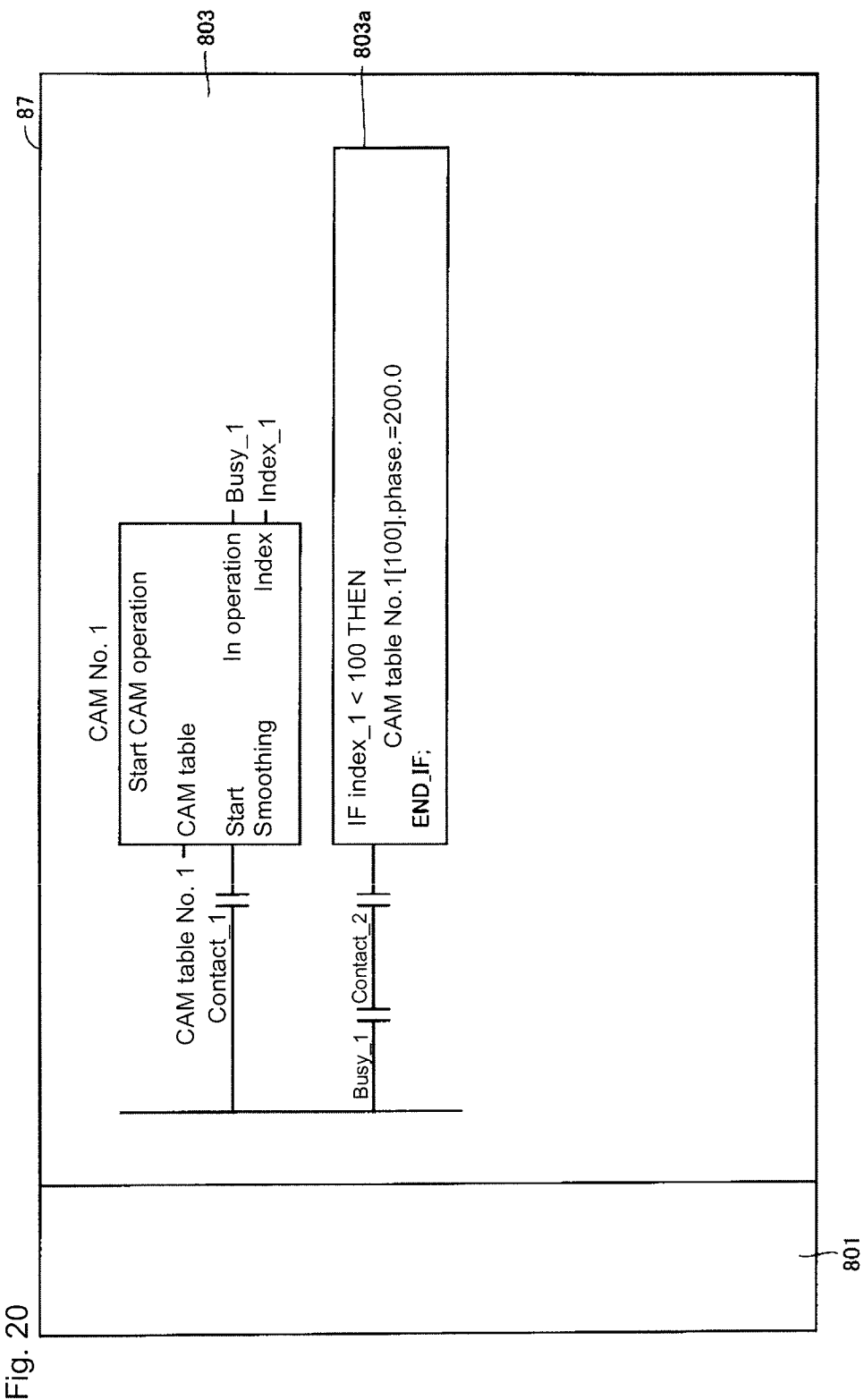
FIG. 20 is a view showing a user interface for rewriting the phase of the CAM table.

FIG. 20 is a view showing a user interface for rewriting the phase of the CAM table in the method in which the user directly describes the program. Similar to FIG. 15, FIG. 20 shows a description example of the rewrite instruction when using the ST (Structure Text) language and the ladder language generally used by the PLC controller.

With reference to FIG. 20, the program by the user is described in the box 803*a* in the region 803, as described above. According to a specific example, in the region 803*a* is described, using the ST language and the ladder language, an instruction to alter the phase of index No. 100 of the CAM table No. 1 to 200° when the output parameter "busy_1" indicating that the electronic cam No. 1 (i.e., electronic cam 500) is in execution and "contact_2" are TRUE, and the CAM data of the CAM table used for the command for the driven shaft is smaller than the index No. 100. In this case, the microprocessor 100 executes the processing described in the region 803.

Figure 25:
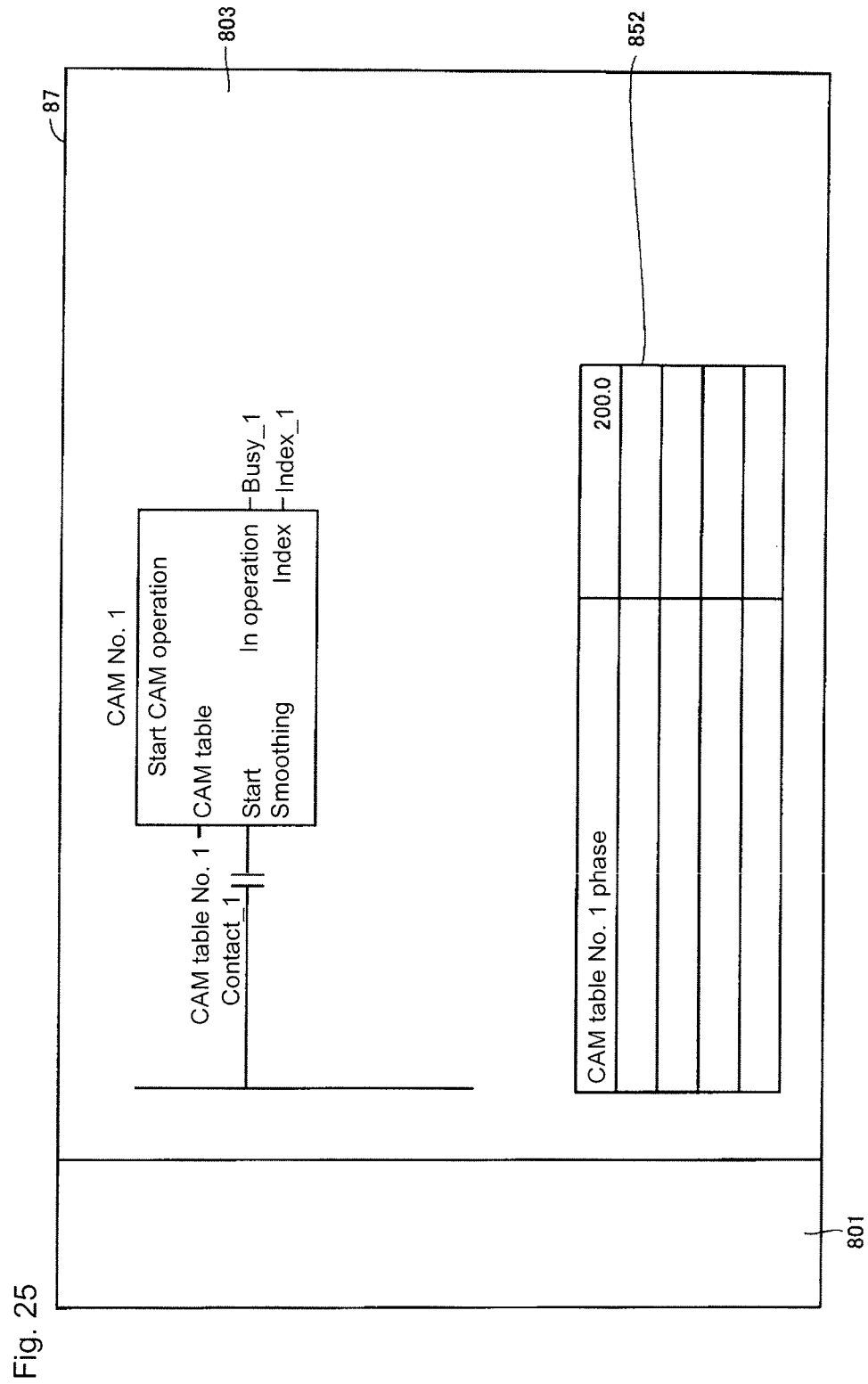
FIG. 25 is a view showing a user interface for rewriting the phase of the CAM table in the method in which the GUI of table format is used.

FIG. 25 is a view showing a user interface for rewriting the phase of the CAM table in the method in which the GUI of table format is used. With reference to FIG. 25, a window 852, which is the GUI of table format, is displayed in the display 87. The user describes in the window 852 a command for altering the phase of the CAM data of index No. 100 of the CAM table No. 1 to 200.0°.

(e3. Ascending Check)

As described above, the user can rewrite even the phase included in the CAM table. The CAM table may be rewritten such that the phases in the CAM data included in the CAM table are not in ascending order. For example, the phases in the CAM table 520 shown in FIG. 11 may become "0.0"→"0.1"→"0.8"→"0.2"→"0.3" . . . .

Assuming such situation, the CPU unit 13 checks whether or not the phases are in ascending order at the start of the operation of the electronic cam and during the operation of the electronic cam. During the operation of the electronic cam, the CPU unit 13 checks, for example, whether or not the phases are in the ascending order at a predetermined interval (e.g., one control period). When determining that the CAM data are not arrayed such that the phases are in ascending order, the CPU unit 13 makes an annunciation defined in advance. Specifically, the CPU unit 13 notifies to the user program 236 a notification of an error warning (error message, error code, audio, and/or image).

(e4. Addition/Deletion of Significant CAM Data)

As described based on FIG. 11, the CAM table includes CAM data that is significant to the electronic cam and the CAM data that is not significant to the electronic cam.

When receiving a user input to add the CAM data, the microprocessor 100 writes the phase and/or the displacement based on such input to one of the non-significant CAM data. The microprocessor 100 executes the instruction defined in advance so that the non-significant CAM data including the phase and/or the displacement based on the input becomes the significant CAM data. In this case, the microprocessor 100 alters the alignment order of the CAM data in the CAM table so that the phases are in ascending order. Accordingly, the number of significant CAM data in the CAM table can be increased.

On the contrary, the significant CAM data can also be changed to the non-significant CAM data. Thus, the number of significant CAM data in the CAM table can be decreased.

(e5. Index Notification)

As described based on FIG. 11, an index number is given to each CAM data configuring the CAM table. The microprocessor 100 notifies the index number to the user program 236. The user is then able to know the index of the CAM data configuring the CAM table.

In particular, the microprocessor 100 may notify the index to the user program 236 during the operation of the electronic cam to realize the rewrite of the CAM table in the screen shown in FIG. 15.

<F. Summary of Processing by CPU Unit>

(1) The CPU unit 13 is a computation unit of the PLC that executes the motion control and the sequence control. The CPU unit 13 includes the microprocessor 100, the control program 230 for carrying out the motion control using the CAM table 520 in which the displacement of the driven shaft of the electronic cam is associated with each phase of the main shaft of the electronic cam 500, and a memory stored with the CAM table 520.

The microprocessor 100 outputs the execution results of the control program 230 to the apparatus to be controlled associated with the driven shaft. When receiving the first command for altering at least one of the plurality of phases or the displacement associated with such phase, the microprocessor 100 alters at least either the phase or the displacement in the CAM table 520 to a value that is on the basis of the first command. When such alteration is carried out, the microprocessor 100 executes the control program 230 using the post-alteration CAM table 520A and outputs the execution results to the apparatus to be controlled.

The CPU unit 13 thus can easily realize the change in the operation of the dependent shaft (apparatus to be controlled) during the electronic cam operation. Furthermore, the CPU unit 13 can fine-tune the device machine difference.

More specifically, the value of the CAM table can be altered and the number of CAM data can be increased/decreased using the user program 236 during the electronic cam operation in the electronic cam operation that uses the CAM table in which the position information of the main shaft and the dependent shaft are defined by using the CPU unit 13. The CPU unit 13 thus can adjust the operation of the dependent shaft.

(2) The memory includes the non-volatile memory 106 and the volatile main memory 104. The non-volatile memory 106 stores the pre-alteration CAM table 520. The microprocessor 100 reads out the pre-alteration CAM table 520 from the non-volatile memory 106, and develops the read CAM table 520 in the main memory 104. When receiving the first command after the development, the microprocessor 100 performs the alteration described above on the CAM table 520 developed in the main memory 104. When receiving the second command, the microprocessor 100 further stores the post-alteration CAM table 520A developed in the main memory in the non-volatile memory 106. The user thus can store the CAM table 520A of after the rewrite in the non-volatile memory 106 separate from the CAM table 520.

(3) The pre-alteration CAM table 520 includes a plurality of CAM data configured by one displacement and one phase. The plurality of CAM data is divided into the significant CAM data (first CAM data) that influences the operation of the electronic cam and the non-significant CAM data (second CAM data) that does not influence the operation of the electronic cam. When receiving the first command, the microprocessor 100 alters at least one of the phase or the displacement in the non-significant CAM data to a value that is on the basis of the first command. The user then can add the significant CAM data in the CAM table 520.

(4) The control program 230 includes the motion computation program 234, and the user program 236 that carries out the processing of giving an instruction necessary for the execution of the motion computation program 234 to the motion computation program 234. An index number (identification information) is associated with each CAM data. The microprocessor 100 notifies the index number to the user program 236 when executing the operation of the electronic cam 500 using the motion computation program 234. The user is then able to know the index of the CAM data configuring the CAM table.

(5) After reading out the pre-alteration CAM table 520 from the non-volatile memory 106, the microprocessor 100 determines whether the CAM data are arrayed such that the phases are in ascending order in the CAM table 520. When determining that the CAM data are not arrayed such that the phases are in ascending order, the microprocessor 100 makes the annunciation defined in advance. The user thus can recognize that the phases need to be in ascending order.

(6) When executing the control program 230, the microprocessor 100 determines whether or not the CAM data are arrayed such that the phases are in ascending order at an interval defined in advance in the CAM table used in the execution of the control program 230 regardless of the presence/absence of alteration in the CAM table. When determining that the CAM data are not arrayed such that the phases are in ascending order, the microprocessor 100 makes the annunciation defined in advance. The user thus can recognize that the phases need to be in ascending order.

(7) The microprocessor 100 receives an instruction to select either the first altering mode or the second altering mode. Upon receiving the first command when receiving the selection of the first altering mode, the microprocessor 100 executes the control program 230 using the post-alteration CAM table 520A in the period of the electronic cam of when the first command is received and the period after such period and thereafter. Upon receiving the first command when receiving the selection of the second altering mode, the microprocessor 100 executes the control program 230 using the pre-alteration CAM table 520 in the period of the electronic cam of when the first command is received and executes the control program 230 using the post-alteration CAM table 520A in the period after such period and thereafter. The CPU unit 13 thus can perform a more stable control when the second altering mode is selected than when the first altering mode is selected.

(8) The microprocessor 100 repeats the execution of the motion computation program 234 every fixed period T1, and repeats the user program 236 every fixed period T2, which is an integral multiple of the fixed period T1. The program for altering the phase and/or the displacement described above in the user program 236 is described in the task of the fixed period T1 or the task of the fixed period T2. The control instruction to rewrite the CAM table thus can be described in the high priority fixed period task or the low priority fixed period task.

As shown in FIG. 1, the CPU unit 13 of the PLC 1 has a configuration of executing the motion control and the sequence control in the PLC system SYS. More specifically, the microprocessor 100 (see FIG. 2) of the CPU 13 executes the motion control and the sequence control.

However, a unit for the motion control and a unit for the sequence control may be separately arranged for the CPU unit 13, so that the motion control and the sequence control may be executed by different processors (microprocessors). That is, the processor of the unit for the motion control may execute the motion control, and the processor for the sequence control may execute the sequence control.

Alternatively, when using a processor of dual core or a processor of multi-core for the microprocessor 100, the CPU unit 13 may be configured such that one core executes the motion control and one of the remaining cores executes the sequence control.

<G. Support Device>

The PLC support device 8 for creating programs to be executed by the PLC 1, performing maintenance of the PLC 1, and the like will now be described.

FIG. 21 is a view showing a state in which the PLC support device 8 displays the CAM curve 510 and the CAM curve 510A on the display 87 of the PLC support device 8. The PLC support device 8 reads out the CAM table 520A stored in the CPU unit 13 based on an instruction from the user. The PLC support device 8 also reads out the CAM curve 510 from the non-volatile memory of the PLC support device 8. The PLC support device 8 displays the CAM curve 510 and the CAM curve 510A based on the CAM table 520A on the display 87.

Alternatively, the PLC support device 8 may read out the CAM curve 510 and the CAM table 520A stored in the CPU unit 13 based on an instruction from the user, and display the read CAM curve 510 and the CAM curve 510A based on the read CAM table 520A on the display 87. That is, the PLC support device 8 may be configured to display the CAM curve 510 acquired from the CPU unit 13 and the CAM curve 510A based n the CAM table 520A acquired from the CPU unit 13.

The PLC support device 8 saves the CAM curve 510 without saving the CAM table 520 of before the rewrite to suppress the amount of data in the memory from increasing. The PLC support device 8 may, however, be configured to save the CAM table 520.

Figure 21A:
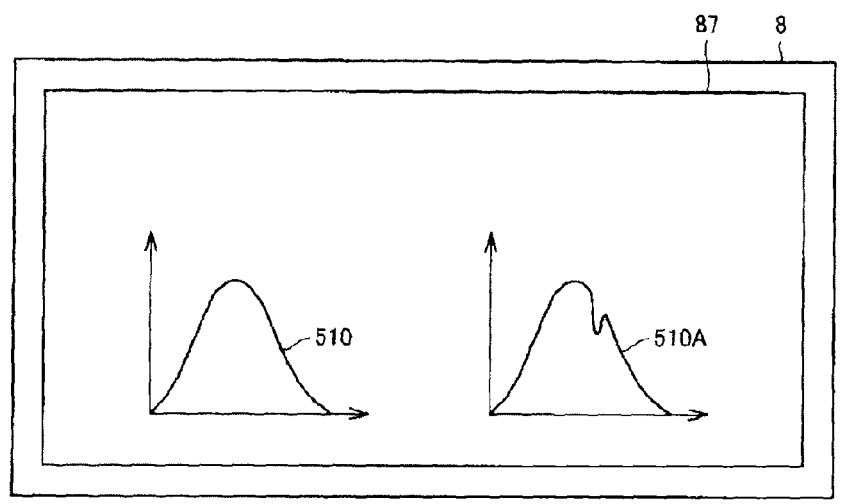
FIGS. 21A and 21B are views showing a state in which a PLC support device displays the CAM curve and the post-alteration CAM curve on the display of the PLC support device.
Figure 21B:
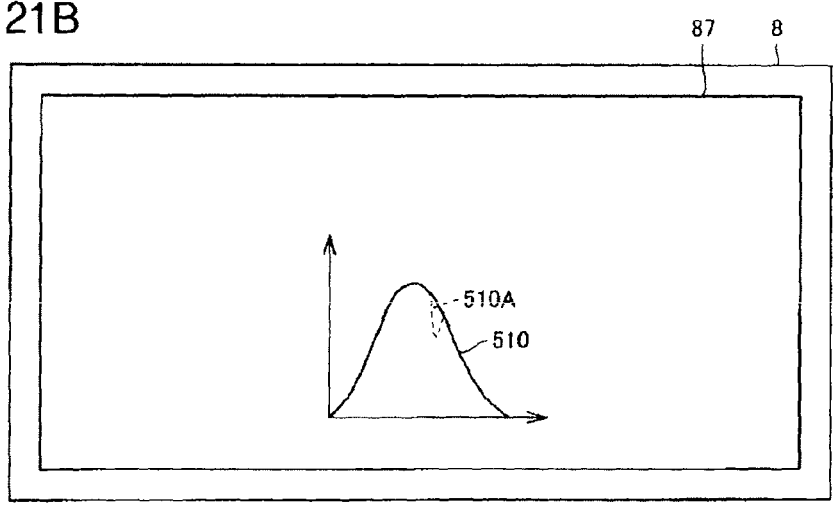

FIG. 21A is a view showing a case in which the CAM curve 510 and the CAM curve 510A are displayed side by side. FIG. 21B is a view showing a case in which the CAM curve 510A is displayed overlapping the CAM curve 510. In FIG. 21B, only the solid line representing the CAM curve 510 is displayed at areas where the curves 510, 510A are overlapped.

With reference to FIGS. 21A and 21B, the PLC support device 8 displays the CAM curve 510 based on the pre-alteration CAM table 520 and the CAM curve 510A based on the post-alteration CAM table 520A on the same screen, so that the user can easily understand intuitively what kind of alteration is made on the CAM table 520. In particular, in the case of FIG. 21B, the user can more clearly recognize the state after the rewrite than in the case of FIG. 21A.

Figure 22A:
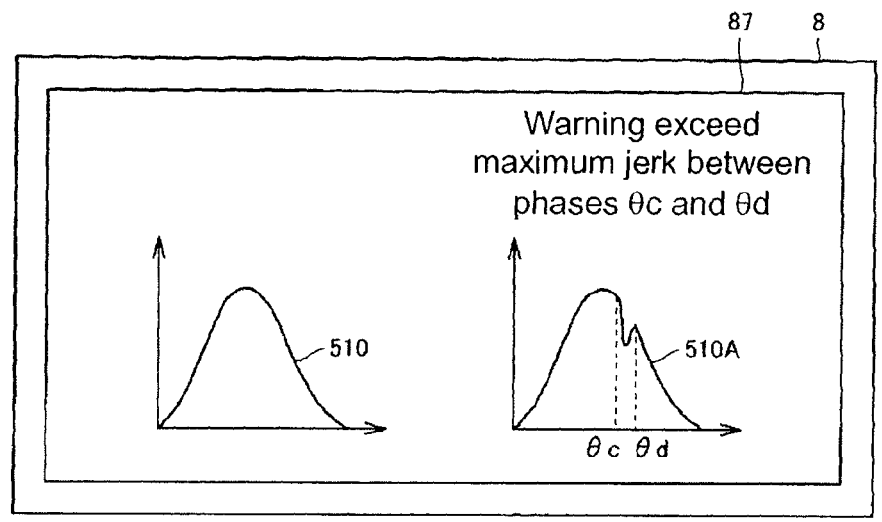
FIGS. 22A and 22B are views showing a state in which a warning display is further made in each state of FIGS. 21A and 21B.
Figure 22B:
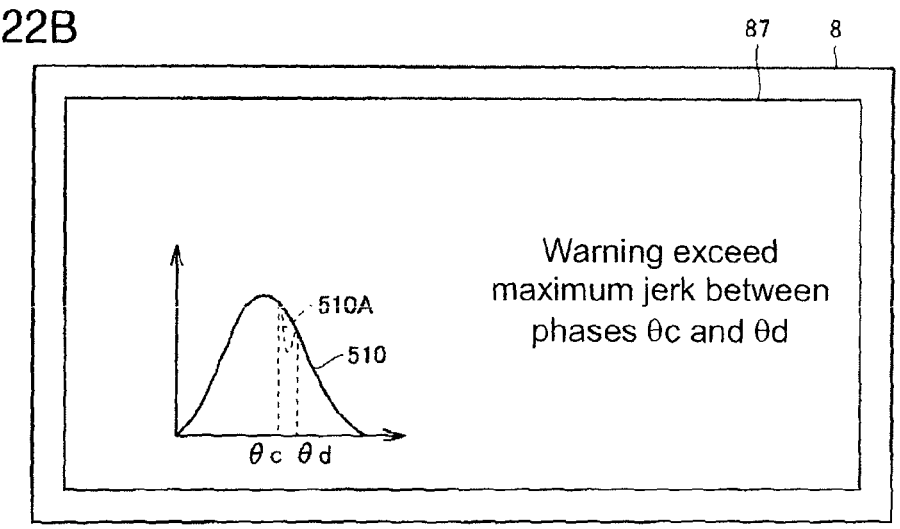

FIGS. 22A and 22B are views showing a state in which a warning display is further made in each state of FIGS. 21A and 21A. With reference to FIGS. 22A and 22B, the PLC support device 8 calculates a surge (jerk) of the driven shaft, which is the control target, based on the CAM table 520A. The PLC support device 8 displays an image indicating that the surge is greater than or equal to a threshold value on the display 87 if the calculated surge is greater than or equal to the threshold value defined in advance. The PLC support device 8, for example, performs a warning display that the jerk exceeds a maximum jerk defined in advance between the phases θc and θd.

The PLC support device 8 is preferably configured to display on the display 87 the area exceeding the threshold value in a display mode different from that of the area not exceeding the threshold value in the CAM curve 510A. For example, the PLC support device is preferably configured to display the area exceeding the threshold value with a color different from that of the area not exceeding the threshold value. The threshold value is stored in advance in the memory of the PLC support device 8.

In the description made above, a warning display is made when exceeding the maximum jerk defined in advance in a certain phase interval, but this is not the sole case, and the PLC support device 8 may be configured to also perform the display warning for the interval exceeding maximum acceleration, maximum deceleration, and/or maximum speed defined in advance. In this case, the PLC support device 8 preferably displays the area exceeding the maximum jerk, the area exceeding the maximum acceleration, and the area exceeding the maximum deceleration in a mode distinguishable by the user.

The PLC support device 8 is also preferably configured to display the area exceeding the threshold value in a display mode different from the area not exceeding the threshold value not only in the CAM curve 510A but also in the CAM curve 510. The threshold value for the CAM curve 510A and the threshold value for the CAM curve 510 may be the same values or may be different values.

The user can specify the maximum speed, the maximum acceleration, the maximum deceleration, and the maximum jerk of the dependent shaft using the PLC support device 8. The PLC support device 8 can display the maximum speed, the maximum acceleration, and the maximum jerk in the graph of the CAM curve. The PLC support device 8 displays the maximum speed in the speed graph of the control graph, displays the maximum acceleration and the maximum deceleration in the acceleration/deceleration graph of the control graph, and displays the maximum jerk in the jerk graph of the control graph. In this case, the PLC support device 8 displays the units of the speed, acceleration, and jerk using specified units (time is fixed to seconds).

Figure 23:
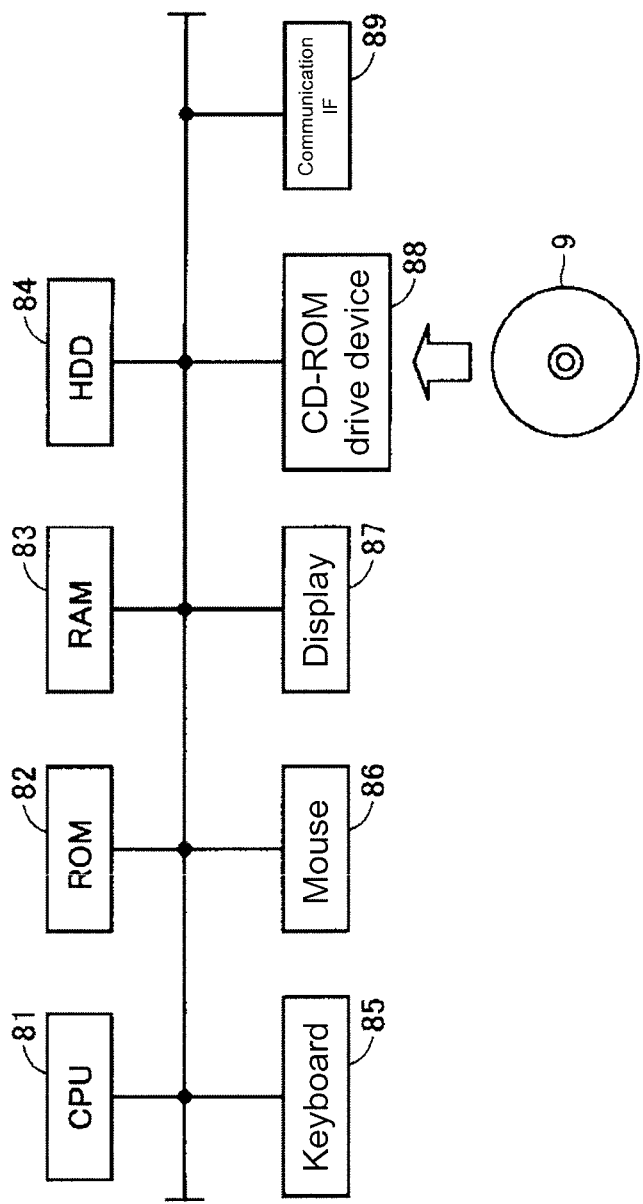
FIG. 23 is a schematic view showing a hardware configuration of the PLC support device used by being connected to the CPU unit.

FIG. 23 is a schematic view showing a hardware configuration of the PLC support device 8 used by being connected to the CPU unit according to the embodiment of the present invention. With reference to FIG. 23, the PLC support device 8 is typically configured by a general-purpose computer. A notebook personal computer that excels in portability is preferable from the standpoint of maintenance property.

With reference to FIG. 23, the PLC support device 8 includes a CPU 81 for executing various types of programs including the OS, a ROM (Read Only Memory) 82 for storing BIOS and various types of data, a memory RAM 83 for providing a work region for storing data necessary for the execution of the program in the CPU 81, and a hard disc (HDD) 84 for storing in a nonvolatile manner the program executed by the CPU 81, and the like.

The PLC support device 8 also includes a keyboard 85 and a mouse 86 for receiving the operation from the user, and the display 87 for presenting information to the user. The PLC support device 8 also includes a communication interface (IF) for communicating with the PLC 1 (CPU unit 13), and the like.

As will be hereinafter described, the various types of programs executed by the PLC support device 8 are distributed by being stored in the CD-ROM 9. The program stored by the CD-ROM 9 is read by a CD-ROM (Compact Disk-Read Only Memory) drive 88, and stored in the hard disc (HDD) 84, and the like. Alternatively, the program may be downloaded from a higher level host computer, and the like through the network.

As described above, the PLC support device 8 is realized using the general-purpose computer, and thus further detailed description will not be made.

Figure 24:
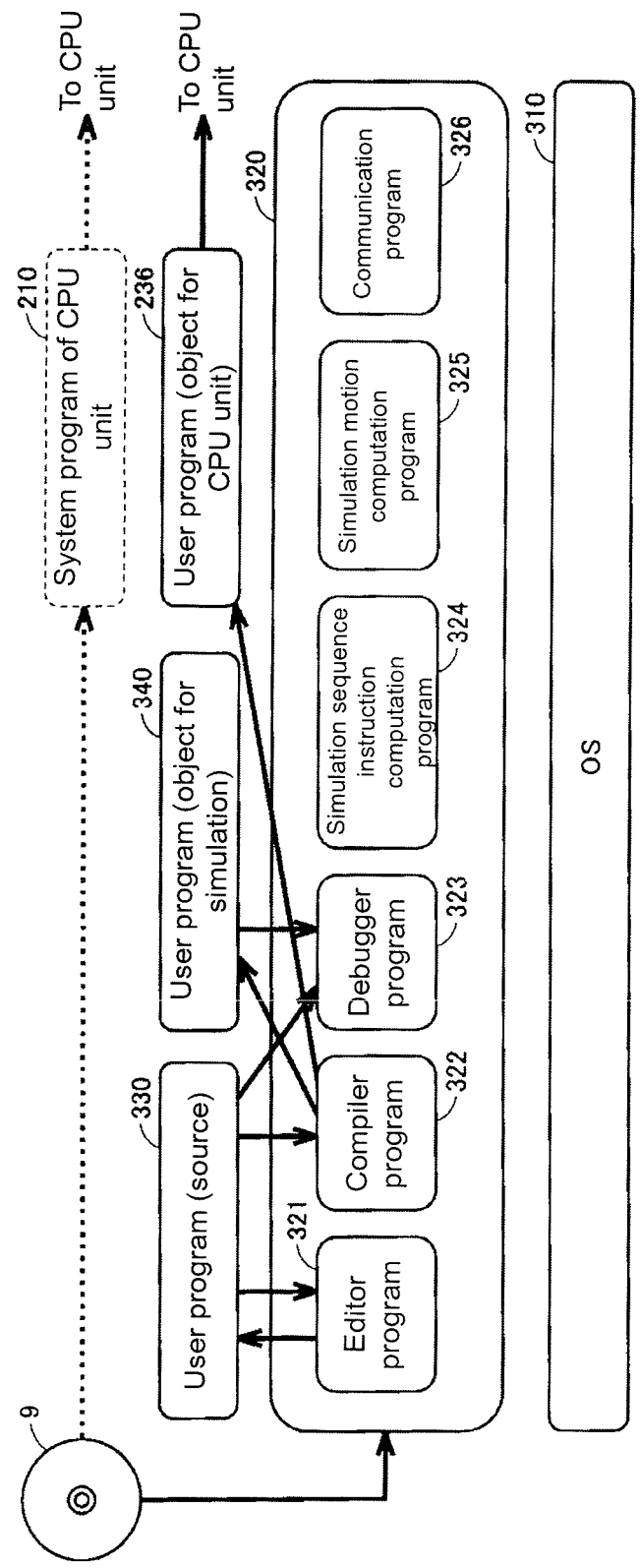
FIG. 24 is a schematic view showing a software configuration of the PLC support device used by being connected to the CPU unit.

FIG. 24 is a schematic view showing a software configuration of the PLC support device 8 used by being connected to the CPU unit according to the embodiment of the present invention. With reference to FIG. 24, the OS 310 is executed in the PLC support device 8 to provide an environment where the various types of programs contained in the PLC support program 320 can be executed.

The PLC support program 320 includes an editor program 321, a compiler program 322, a debugger program 323, a simulation sequence instruction computation program 324, a simulation motion computation program 325, and a communication program 326. Each program contained in the PLC support program 320 is typically distributed by being stored in the CD-ROM 9 and installed in the PLC support device 8.

The editor program 321 provides functions of input and edit for creating the user program 236. More specifically, in addition to the function of creating the source program 330 of the user program 236 when the user operates the keyboard 85 and the mouse 86, the editor program 321 provides the save function and the edit function of the created source program 330. The editor program 321 receives the input of the source program 330 from outside.

The compiler program 322 provides a function of compiling the source program 330 and generating the user program 236 of object program format executable by the microprocessor 100 of the CPU unit 13. The compiler program 322 also provides a function of compiling the source program 330 and generating the user program 340 of object program format executable by the CPU 81 of the PLC support device 8. The user program 340 is an object program for simulation used to simulate the operation of the PLC 1 by the PLC support device 8.

The debugger program 323 provides a function for performing debugging on the source program of the user program. The content of the debugging includes operations such as partially executing the range specified by the user in the source program, and following the temporal change of the variable value during the execution of the source program.

The debugger program 323 further provides a function of executing the user program 340, which is the object program for simulation. At the time of simulation, the simulation sequence instruction computation program 324 and the simulation motion computation program 325 included in the PLC support program 320 are used in place of the sequence instruction computation program 232 and the motion computation program 234 included in the system program of the CPU unit 13.

The communication program 326 provides a function of transferring the user program 236 to the CPU unit 13 of the PLC 1.

Generally, the system program 210 mounted on the PLC 1 is stored in the non-volatile memory 106 of the CPU unit 13 at a manufacturing stage of the CPU unit 13. However, if the system program 210 is stored in the CD-ROM 9, the user can copy the system program 210 of the CD-ROM 9 to the PLC support device 8, and transfer the copied system program 210 to the CPU unit 13 using the function provided by the communication program 326. Furthermore, if the real time OS 200 to be executed by the CPU unit 13 of the PLC 1 is stored in the CD-ROM 9, the real time OS 200 can be re-installed to the PLC 1 by user operation.

<H. Summary of Processing by Support Device>

(1) The PLC support device 8 is an assistance device for creating the user program 236 to be executed by the CPU unit 13 of the PLC. The CPU unit 13 includes a memory stored with the CAM curve 510 in which the displacement of the driven shaft of the electronic cam is associated with each phase of the main shaft of the electronic cam 500, and the CAM table 520A in which the displacement associated with one of the plurality of phases is altered. The PLC support device 8 includes the CPU 81, the memory stored with the CAM curve 510 and the PLC support program 320 that assists the creation of the user program 236, the display 87, and the communication IF 89 for performing communication with the CPU unit 13. When receiving the command defined in advance, the CPU 81 acquires the CAM curve 510 and the CAM table 520A from the CPU unit 13 using the communication IF 89. The CPU 81 displays the CAM curve 510 stored in the memory or the CAM curve 510 acquired from the CPU unit 13, and the CAM curve 510A based on the acquired CAM table 520A on the display 87.

That is, the PLC support device 8 displays the CAM curves of before and after the alteration in a comparative manner on the display. The user thus can compare the CAM curve 510 based on the pre-alteration CAM table 520 (before rewrite) and the CAM curve 510A based on the post-alteration CAM table 520A on the display 87 of the PLC support device 8.

(2) The PLC support program 320 stores in advance the threshold value associated with surge. The CPU 81 calculates the surge of the apparatus to be controlled, which is the driven shaft, based on the CAM table 520A. If the calculated surge is greater than or equal to the threshold value, the CPU 81 displays an image indicating that the surge is greater than or equal to the threshold value on the display 87. The user thus can check whether or not the rewrite of the CAM table associated with surge is appropriate.

(3) The PLC support program 320 stores in advance the threshold value associated with speed. The CPU 81 calculates the speed of the apparatus to be controlled, which is the driven shaft, based on the CAM table 520A. If the calculated speed is greater than or equal to the threshold value, the CPU 81 displays an image indicating that the speed is greater than or equal to the threshold value on the display 87. The user thus can check whether or not the rewrite of the CAM table associated with speed is appropriate.

(4) The PLC support program 320 stores in advance the threshold value associated with acceleration and/or deceleration. The CPU 81 calculates the acceleration of the apparatus to be controlled, which is the driven shaft, based on the CAM table 520A. If the calculated acceleration and/or deceleration is greater than or equal to the threshold value, the CPU 81 displays an image indicating that the acceleration and/or deceleration is greater than or equal to the threshold value on the display 87. The threshold value associated with acceleration and the threshold value associated with deceleration may be the same or may be different. The user thus can check whether or not the rewrite of the CAM table associated with acceleration and/or deceleration is appropriate.

(5) The CPU 81 displays on the display 87 the area exceeding the threshold value in a display mode different from the area not exceeding the threshold value in the CAM curve 510A. The user then can easily determine the area exceeding the threshold value.

The embodiments disclosed herein are illustrative in all aspects and should not be recognized as being restrictive. The scope of the present invention is defined by the Claims rather than by the description made above, and the meaning equivalent to the Claims and all modifications within the scope are intended to be enclosed herein.

DESCRIPTION OF SYMBOLS

1 PLC
2 field network
3 servo motor driver
4 servo motor
5 terminal
6 detection switch
7 relay
8 PLC support device
10 connection cable
11 system bus
12 power supply unit
13, 14, 53 IO unit
15 special unit
19 encoder
51 terminal bus
52 communication coupler
83 RAM
87 display
89 communication IF
100 microprocessor
102 chip set
104 main memory
106 non-volatile memory
108 system timer
110 connector
120 system bus controller
122, 142 control circuit
124 system bus control circuit
126, 146 buffer memory
130 system bus connector
140 field network controller
144 field network control circuit
200 real time OS
210, 220 system program
212 scheduler program
230 control program
232 sequence instruction computation program
234 motion computation program
236, 340 user program
400 main shaft
500 electronic cam
500A mechanical CAM
501 electronic cam computation unit
502 interpolation unit
503 switch unit
520, 521, 522, 520A CAM table
510, 510A CAM curve
530 structure array
600 driven shaft
ME CAM mechanism
SYS system

The invention claimed is:

1. A computation unit of a programmable logic controller configured to execute a motion control and a sequence control, the computation unit comprising:
a processor; and
a memory configured to store a computer-aided manufacturing (CAM) table and a program for performing the motion control using the CAM table, in which a displacement of a driven shaft of an electronic cam is associated with each phase of a plurality of phases of a main shaft of the electronic cam, wherein the processor is configured to,
- output execution results of the program to an apparatus to be controlled associated with the driven shaft,
- receive a first command for altering at least one of a phase of the plurality of phases or a displacement associated with the phase of the plurality of phases,
- perform alteration of the CAM table, upon receiving the first command, by replacing at least one of the phase or the displacement in the CAM table with a value based on the first command, to obtain a post-alteration CAM table,
- execute the program using the post-alteration CAM table, and output the execution results to the apparatus to be controlled; and
- receive an instruction to select either a first altering mode or a second altering mode, wherein, in the execution of the program using the post-alteration CAM table,
- when the selection of the first altering mode is received and when the first command is received in a current period of the electronic cam, the processor executes the program using the post-alteration CAM table in the current period, in which the first command is received, and in a subsequent period after the current period, and
- when the selection of the second altering mode is received and when the first command is received in the current period, the processor executes the program using a pre-alteration CAM table, which is the CAM table before the alteration is performed, in the current period, and executes the program using the post-alteration CAM table in the subsequent period after the current period.

2. The computation unit according to claim 1, wherein
the memory comprises a non-volatile memory and a volatile memory;
the non-volatile memory stores the pre-alteration CAM table; and
the processor is configured to:
- read the pre-alteration CAM table from the non-volatile memory and develop the read CAM table in the volatile memory,
- perform, when receiving the first command after the development, the alteration on the CAM table developed in the volatile memory,
- receive a second command, and
- store the post-alteration CAM table developed in the volatile memory in the non-volatile memory, when receiving the second command.

3. The computation unit according to claim 2, wherein
the pre-alteration CAM table comprises a plurality of CAM data, each CAM data including one displacement and one phase,
the plurality of CAM data are divided into first CAM data that influences an operation of the electronic cam and second CAM data that does not influence the operation of the electronic cam, and
when receiving the first command, the processor replaces at least either the phase or the displacement in the second CAM data with the value based on the first command.

4. The computation unit according to claim 3, wherein
the program comprises a motion computation program, and a user program configured to perform processing of providing an instruction to the motion computation program, the instruction being necessary for the execution of the motion computation program,
identification information is associated with each CAM data, and
the processor notifies the identification information to the user program, when executing the operation of the electronic cam using the motion computation program.

5. The computation unit according to claim 4, wherein
the processor is configured to:
- determine whether or not the plurality of CAM data in the pre-alteration CAM table are arranged in ascending order of phase, after reading the pre-alteration CAM table from the non-volatile memory, and
- make a predetermined annunciation when determining that the plurality of CAM data are not arranged in ascending order of phase.

6. The computation unit according to claim 4, wherein
the processor is configured to:
- determine, at a predetermined interval during execution of the program, whether or not the plurality of CAM data in the CAM table used in the execution of the program are arranged in ascending order of phase, regardless of whether or not the CAM table is altered, and
- make a predetermined annunciation when determining that the plurality of CAM data are not arranged in ascending order of phase.

7. The computation unit according to claim 1, wherein
the program comprises a motion computation program, and a user program configured to perform processing of providing an instruction to the motion computation program, the instruction being necessary for the execution of the motion computation program,
the processor is configured to:
- repeat the execution of the motion computation program every first fixed period, and
- repeat the user program every second fixed period, which is integral multiple of the first fixed period; and
the program configured to perform the alteration in the user program is described in a task of the first fixed period or a task of the second fixed period.

8. The computation unit according to claim 1, wherein, in the execution of the program using the post-alteration CAM table, the processor performs operations comprising:
- receiving a phase of a main shaft;
- obtaining an displacement of the driven shaft based on the received phase of the main shaft and the post-alteration CAM table;
- performing interpolation processing based on the obtained displacement of the driven shaft to obtain a command position; and
- outputting the command position to the apparatus to be controlled.

9. The computation unit according to claim 1, wherein
the CAM table comprises a plurality of CAM data, each CAM data including one displacement associated with one phase,
the first command includes information that selects at least one of the plurality of CAM data, and a specific amount of at least one of the displacement and the phase, and the processer performs alteration of the CAM table, by replacing at least one of the displacement and the phase of the selected at least one of the plurality of CAM data, with the value corresponding to the specific amount in the first command or the value obtained by adding the specific amount to the at least one of the displacement and the phase of the selected at least one of the plurality of CAM data.

10. The computation unit according to claim 1, wherein the first command is based on an user input;

the processor further performs operations comprising:

acquiring, from the apparatus to be controlled, first, second and third phases of a main shaft, respectively, in a preceding period, the current period and the subsequent period, the preceding period being a period before the current period;

in the preceding period, executing the program to obtain a displacement of the driven shaft based on the acquired first phase of the main shaft and the pre-alteration CAM table, both in the first altering mode and in the second altering mode; and outputting a command position of the driven shaft to the apparatus to be controlled based on the obtained displacement of the driven shaft;

in the current period, the pre-alteration CAM table is altered to the post-alteration CAM table based on the received first command, without using the acquired second phase of the main shaft, both in the first altering mode and in the second altering mode;

in the subsequent period, executing the program to obtain a displacement of the driven shaft based on the acquired third phase of the main shaft and the post-alteration CAM table, both in the first altering mode and in the second altering mode; and outputting a command position of the driven shaft to the apparatus to be controlled based on the obtained displacement of the driven shaft.

11. The computation unit according to claim 10, wherein the processor further performs operations comprising:

in the current period, executing the program to obtain a displacement of the driven shaft based on the acquired second phase of the main shaft and the post-alteration CAM table, in the first altering mode;

executing the program to obtain a displacement of the driven shaft based on the acquired second phase of the main shaft and the pre-alteration CAM table, in the second altering mode; and outputting a command position to the apparatus to be controlled based on the obtained displacement of the driven shaft.

12. The computation unit according to claim 10, wherein the first, second and third phases of the main shaft are acquired from an encoder of the apparatus to be controlled.

13. An output control method in a computation unit of a programmable logic controller configured to execute a motion control and a sequence control, the computation unit storing a computer-aided manufacturing (CAM) table and a program for performing the motion control using the CAM table, in which a displacement of a driven shaft of an electronic cam is associated with each phase of a plurality of phases of a main shaft of the electronic cam, the output control method comprising:

outputting, by a processor of the computation unit, execution results of the program to an apparatus to be controlled associated with the driven shaft;

receiving, by the processor, a first command for altering at least one of a phase of the plurality of phases or a displacement associated with the phase of the plurality of phases, performing alteration of the CAM table, by the processor, upon receiving the first command, by replacing at least one of the phase or the displacement in the CAM table with a value based on the first command, to obtain a post-alteration CAM table;

executing the program using the post-alteration CAM table, and outputting the execution results to the apparatus to be controlled; and receiving, by the processor, an instruction to select either a first altering mode or a second altering mode, wherein, in the executing of the program using the post-alteration CAM table, when the selection of the first altering mode is received and when the first command is received in a current period of the electronic cam, the program is executed by the processor using the post-alteration CAM table in the current period, in which the first command is received, and in a subsequent period after the current period, and when the selection of the second altering mode is received and when the first command is received in the current period, the program is executed by the processor using a pre-alteration CAM table, which is the CAM table before the alteration is performed, in the current period, and the program is executed by the processor using the post-alteration CAM table in the subsequent period after the current period.

14. A non-transitory computer-readable recording medium storing a program configured to control a computation unit of a programmable logic controller configured to execute a motion control and a sequence control, the computation unit storing a computer-aided manufacturing (CAM) table and a motion control program configured to perform the motion control using the CAM table, in which a displacement of a driven shaft of an electronic cam is associated with each phase of a plurality of phases of a main shaft of the electronic cam, the program causing the computation unit to perform operations comprising:

outputting execution results of the motion control program to an apparatus to be controlled associated with the driven shaft;

receiving a first command for altering at least one of a phase of the plurality of phases or a displacement associated with the phase of the plurality of phases, performing alteration of the CAM table, upon receiving the first command, by replacing at least one of the phase or the displacement in the CAM table with a value based on the first command, to obtain a post-alteration CAM table;

executing the motion control program using the post-alteration CAM table, and outputting the execution results to the apparatus to be controlled; and receiving an instruction to select either a first altering mode or a second altering mode, wherein, in the executing of the motion control program using the post-alteration CAM table, when the selection of the first altering mode is received and when the first command is received in a current period of the electronic cam, the motion control program is executed using the post-alteration CAM table in the current period, in which the first command is received, and in a subsequent period after the current period, and when the selection of the second altering mode is received and when the first command is received in the current period, the motion control program is executed using a pre-alteration CAM table, which is the CAM table before the alteration is performed, in the current period, and the motion control program is executed using the post-alteration CAM table in the subsequent period after the current period.

* * * * *